(12) United States Patent
Zhou et al.

(10) Patent No.: US 7,872,653 B2
(45) Date of Patent: Jan. 18, 2011

(54) MESH PUPPETRY

(75) Inventors: Kun Zhou, Beijing (CN); Xiaohan Shi, Hangzhon (CN); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 11/764,557

(22) Filed: Jun. 18, 2007

(65) Prior Publication Data

US 2008/0309664 A1 Dec. 18, 2008

(51) Int. Cl.
*G06T 15/00* (2006.01)
(52) U.S. Cl. .................. 345/473; 345/474; 345/475; 345/505; 345/586; 345/648
(58) Field of Classification Search ............ 345/473, 345/474, 475, 505, 586, 648
See application file for complete search history.

(56) References Cited

U.S. PATENT DOCUMENTS

| 6,970,171 B2 | 11/2005 | Baraff et al. |
| 2002/0154115 A1 | 10/2002 | Borac |

FOREIGN PATENT DOCUMENTS

KR 20040049526 A 12/2004

OTHER PUBLICATIONS

Huang et al.,. Jul. 2006. Subspace gradient domain mesh deformation. ACM Trans. Graph. 25, 3, 1126-1134.*

* cited by examiner

*Primary Examiner*—Phu Nguyen
(74) *Attorney, Agent, or Firm*—Lee & Hayes, PLLC

(57) ABSTRACT

This disclosure describes a variational framework for detail-preserving skinned mesh manipulation or deformation. The skinned mesh deformation occurs by optimizing skeleton position and vertex weights of a skeletal skinned mesh in an integrated manner. The process allows creating new poses and animations by specifying a few desired constraints for the skeletal skinned mesh in an interactive deformation platform. This process adjusts the skeletal position and solves for a deformed skinned mesh simultaneously with an algorithm in conjunction with the constraints. The algorithm includes a cascading optimization procedure. The mesh puppetry displays skinned mesh manipulation in real-time.

The user interface will enable interactive design in creating new poses and animations for a skeletal skinned mesh, enabling direct manipulation of the skeletal skinned mesh to create natural, life-like poses, and providing automatic balancing and most-rigid constraints to create a puppet-like animation.

11 Claims, 20 Drawing Sheets

REFERENCE MESH 302

REFERENCE MESH 304

REFERENCE MESH 306

REFERENCE MESH 308

```
Solver at a glance:
s = 0
repeat
    // PERFORM ONE V-PHASE
    for i = 1 to v-step-cnt do
        // s-th iteration in convergence
sequence
        s ++
        // For each (active) level
        for k=1 to min (s,5) do
            // m-th iteration on this level k
            m = s - k
            // sum up first k constraints Linear solve to get
    // PERFORM ONE W-PHASE
    for i = 1 to w-step-cnt do Linear solve to get
    until (convergence criterion met)
```

| 1202 | 1204 | 1206 | 1208 | 1210 |

1402

1404

1406

MESH PUPPETRY

TECHNICAL FIELD

The subject matter relates generally to mesh deformation, and more specifically, to a variational framework with interactive design tools for detail-preserving skinned mesh manipulation, known as mesh puppetry.

BACKGROUND

Early detail-preserving mesh deformation techniques were based multi-resolution techniques. Casting mesh deformation as an energy minimization problem allowed more global and complex deformation. Typically, the energy functions used in these techniques contain terms to preserve detail (often through Laplacian coordinates), as well as position-constraint terms to allow for direct manipulation. Additional suggestions include introducing more terms in the optimization (e.g., volume or skeleton constraints) as a convenient way to design more complex deformation with ease, without the traditional shearing artifacts appearing in large scale deformation. However, these existing techniques do not currently scale, as the optimizations involved are often nonlinear and require slow-converging Gauss-Newton iterations. These methods rely on a good initial guess to converge to a correct solution and are generally slow to achieve convergence.

A technique, the graphics industry uses is Skeleton Subspace Deformation (SSD) and several variants as a natural and efficient representation for character animation in games and films. However, SSD and these variants restrict deformation to a particular subspace for efficiency, causing shortcomings such as a characteristic "collapsing joint" defect as well as the tedious tweaking of vertex weights. Despite significant improvements to allow for easier mesh manipulation and interpolation, these rigging tools do not allow for rapid design of complex deformation. Rigging is not very effective as the user has to manipulate a properly-designed skeleton to deform the posture of a character. Unfortunately, moving the skeleton of a "skinned mesh" causes the mesh to follow with unpleasant consequences. Thus, applying skinning (or "binding") matches the fine-detail shape of the mesh to the positions of the skeletons based on functional optimization and differential coordinates. While these approaches to mesh deformation have pros and cons, neither allows for interactive design of high-quality, large-scale or fine-scale deformation of detailed meshes.

To further illustrate the problems of skinned mesh deformation, deformation energy involving variables, such as vertex positions and bone transformations, are delicate to formulate. Traditional Inverse Kinematics (IK) allow efficient large-scale deformation of skeletal figures through optimization of an energy function in the null space of constraints. IK constraints are highly nonlinear, often involving inequalities. Furthermore, existing mesh deformation solvers used to solve nonlinear constraints, even with multigrid strategies, have lead to poor performance. Thus, mesh deformation techniques have not provided interactive design tools and a satisfying user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes a variational framework for detail-preserving skinned mesh manipulation or deformation, known as mesh puppetry. The skinned mesh deformation occurs by optimizing skeleton position and vertex weights of a skeletal skinned mesh in an integrated manner. The process allows creating new poses and animations by specifying a few desired constraints for the skeletal skinned mesh in an interactive deformation platform. This process adjusts the skeletal position and solves for a deformed skinned mesh simultaneously by using an algorithm (cascading optimization) in conjunction with the constraints. Finally, the mesh puppetry displays the skinned mesh manipulation in real-time.

The user interface enables interactive design in creating these new poses and animations for a skeletal skinned mesh by enabling direct manipulation of the skeletal skinned mesh to create natural, life-like poses, and providing automatic balancing and most-rigid constraints to create a puppet-like animation. Combining these deformation techniques and skeleton-based rigging offers mesh puppetry, which is a fast, intuitive, and general tool for direct mesh manipulation and self-collision avoidance.

BRIEF DESCRIPTION OF THE DRAWINGS

The Detailed Description is set forth with reference to the accompanying figures. The teachings are described with reference to the accompanying figures. In the figures, the leftmost digit(s) of a reference number identifies the figure in which the reference number first appears. The use of the same reference numbers in different figures indicates similar or identical items.

DETAILED DESCRIPTION

Overview

Figure 1:
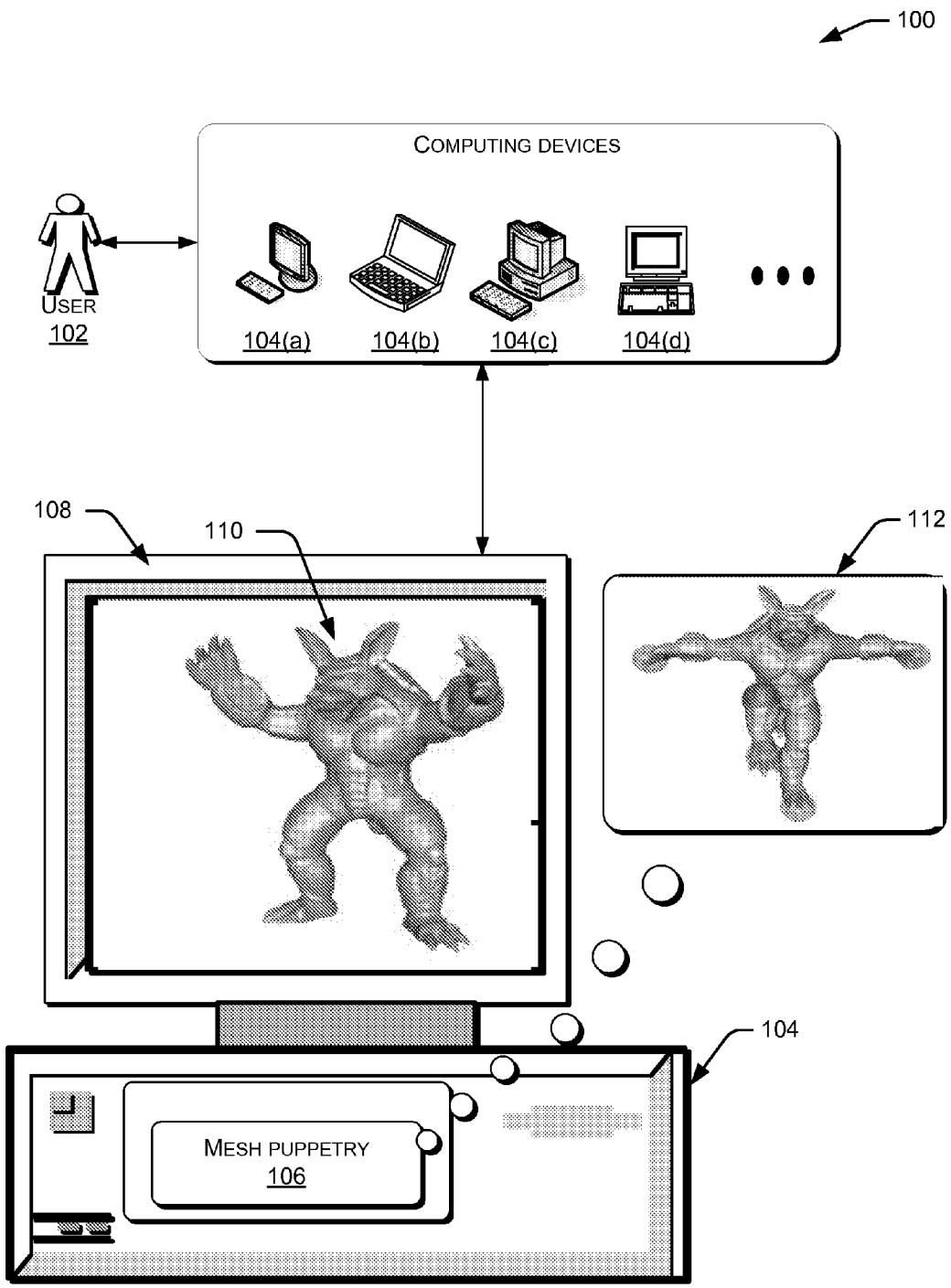
FIG. 1 is a block diagram of an exemplary detail-preserving skinned mesh system.

This disclosure is directed to a variational framework for detail-preserving skinned mesh manipulation or deformation, known as mesh puppetry. This is shown and described in the context of optimizing skeleton position and vertex weights in an integrated manner using an algorithm with a cascading optimization approach. Traditional mesh deformation techniques are inadequate for providing an interactive design platform, such as interactive deformation tools for real-time animation creations, pose changes, transfers, and motion retargetings. However, the detail-preserving skinned mesh manipulation framework described herein provides users with high-level, intuitive, and interactive design tools.

This disclosure describes enabling large scale deformation accelerating convergence while optimizing induced local deformation to maintain small-scale features of the skeletal skinned mesh. This process occurs by specifying a few desired constraints, such as Laplacian constraints for preservation of surface details of an undeformed skinned mesh, position constraints to allow direct manipulation of the skinned mesh, and Inverse Kinematics constraints to provide natural poses with minimal user interaction. Some constraints deal with detail preservation, while others control large-scale deformation.

In one aspect, an algorithm, known as a custom solver uses a cascading optimizing approach, which adjusts the skeleton of the skinned mesh and solves for the deformed skinned mesh simultaneously. The custom solver has two alternating phases, one for optimizing the skeletal bones and the other for optimizing the vertex weights. The phase for optimization of the skeletal bones uses the cascading optimization approach, by performing threads in parallel and feeding on each other, which accelerates convergences to optimize affine transformation. The phase for optimization of the vertex weights uses one thread and a quadratic objective function to reinstate the shape and details of the skinned mesh. Thus, the custom solver algorithm allows real-time manipulations of the skinned meshes with over 50,000 vertices.

In order to optimize position only, creating a tetrabone helps to avoid using trigonometric functions in the optimization procedure. For example, each bone is associated with two additional, virtual vertices to create a non-degenerate tetrahedron, the tetrabone and tetravertices (not to be confused with mesh vertices). Thus, the tetravertices can capture the bone undergoing any affine transformation. This disclosure combines these techniques and skeleton-based rigging to offer mesh puppetry, a fast, intuitive, and general tool for direct skinned mesh manipulation and self-collision avoidance.

Thus, the variational framework for detail-preserving skinned mesh manipulation with mesh puppetry vastly improves the efficiency and convenience of the user experience. The detail-preserving mesh manipulation framework described herein are not limited to any particular application, but many be applied in many contexts and environments. By way of example and not limitation, the mesh puppetry may be employed in animations, deformation transfers, motion retargetings, template matching, games, cartoons, videos, films, 3D pose in real-time, and the like.

Exemplary Detail-Preserving Skinned Mesh System.

FIG. 1 is an overview block diagram of an exemplary detail-preserving skinned mesh framework or system 100 for providing a mesh puppetry. Shown is a user 102 with computing device(s) 104 to access the detail-preserving skinned mesh system 100 through a variational framework for mesh puppetry. The system 100 may provide mesh puppetry, including, but not limited to, as a tool, a method, a solver, software, an application program, a service, and the like.

Communication devices 104 that are suitable for use with the system 100, include but are not limited to, a personal computer 104(a), a laptop computer 104(b), a desktop computer 104(c), a workstation computer 104(d), and the like. These various types of computing devices 104 in operation with the mesh puppetry, shown in an exemplary application program 106, enable the user 102 to directly manipulate the skeletal skinned mesh.

Illustrated in FIG. 1 is a display monitor 108 on which the mesh puppetry application program 106 provides an algorithm for adjusting the skeleton and solving for the deformed skinned mesh simultaneously. Here, the mesh puppetry application program 106 displays an armadillo 110 in a model pose on the display monitor 108. The armadillo 110 can be manipulated to take a sport pose 112 in a matter of seconds. Thus, the mesh puppetry application program 106 allows the user 102 to manipulate directly the armadillo 110 to provide pleasing and realistic poses 112 while preserving fine-scale geometric details.

Figure 2:
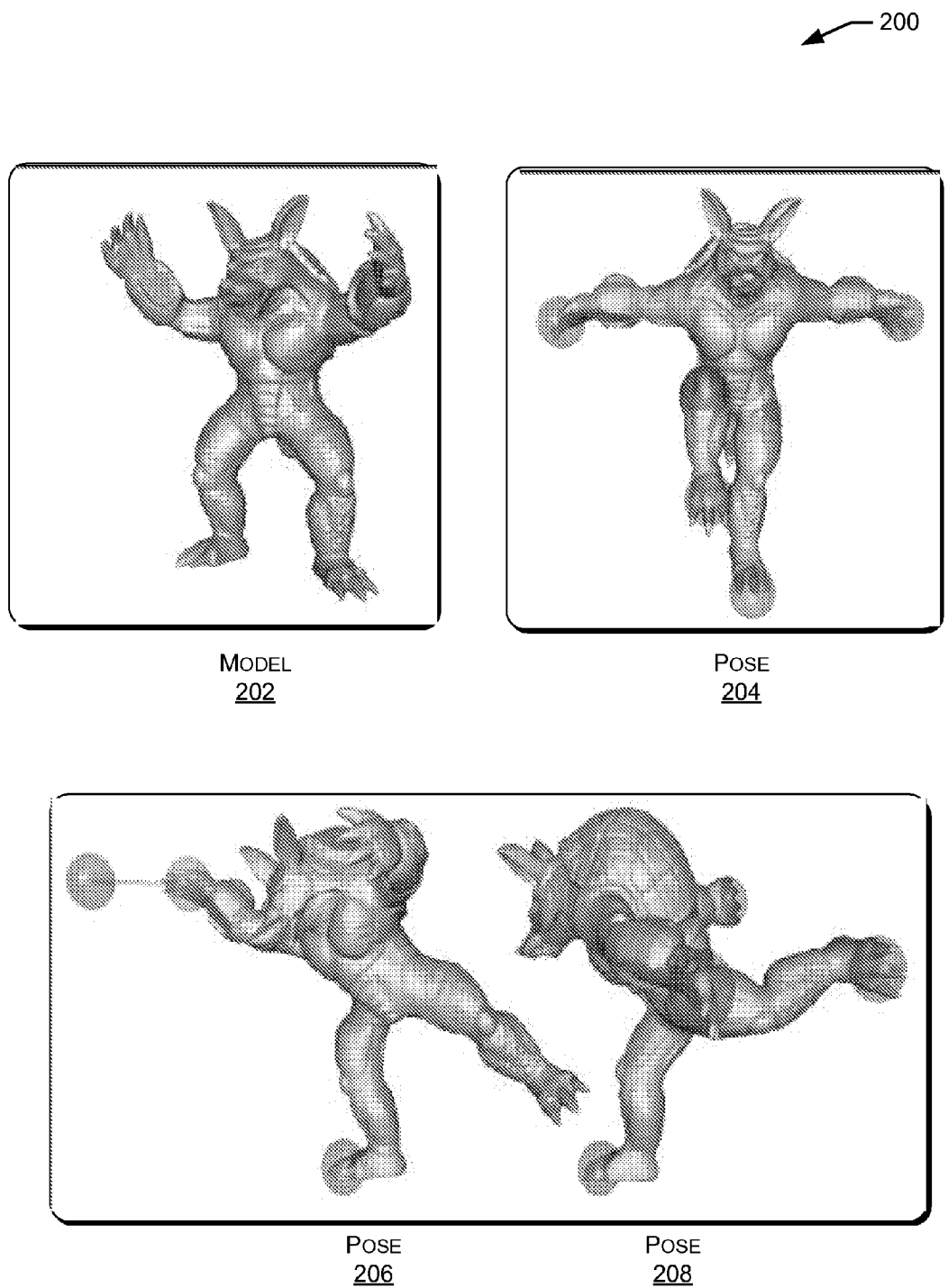
FIG. 2 is a block diagram of exemplary detail-preserving skinned mesh poses implemented by the system of FIG. 1.

Turning to FIG. 2, this figure illustrates exemplary detail-preserving skinned mesh poses 200 implemented by the mesh puppetry system 100 of FIG. 1. The mesh puppetry application program 106 allows the user 102 to directly manipulate the skinned mesh. Thus, the user 102 creates new poses and animations by specifying a few desired constraints on either vertex positions, balance of the character, length, rigidity preservation, or joint limits. In particular, using Laplacian constraints for the preservation of surface details; position constraints to allow direct manipulation of the skinned mesh for intuitive design; and Inverse Kinematics constraints (on balance and bone lengths for instance) that provides natural poses with minimal user interaction. More detailed discussion of constraints follow in FIG. 5.

Illustrated in FIG. 2, the mesh puppetry application program 106 illustrates the armadillo 202 in a model pose. The user 102 can manipulate the armadillo 202 to take a variety of sport poses. The body of the armadillo 202 remains fixed while manipulating the hands and feet to make the armadillo appear to bounce off a springboard 204. Thus, the mesh puppetry application program 106 provides realistic poses such as diving off a springboard, while preserving fine-scale geometric details.

In another example, the user 102 can manipulate the armadillo 202 to reach for a target, such as a shot put, shown as pose 206. With the mesh puppetry application program 106, the body of the armadillo automatically leans forward and raises the left leg backward to keep balance when trying to reach the target 206. In another example, the body of the armadillo 202 remains fixed while manipulating the hands and feet to make the armadillo 202 appear to take the pose of a sprint athlete on a finish line 208. With simple, high-level constraints on length, balance, and joint angles, the framework offers an intuitive, interactive, and real-time tool to design pleasing and/or realistic poses while preserving fine-scale geometric details.

Skinned Mesh and Tetrabones

Figure 3:
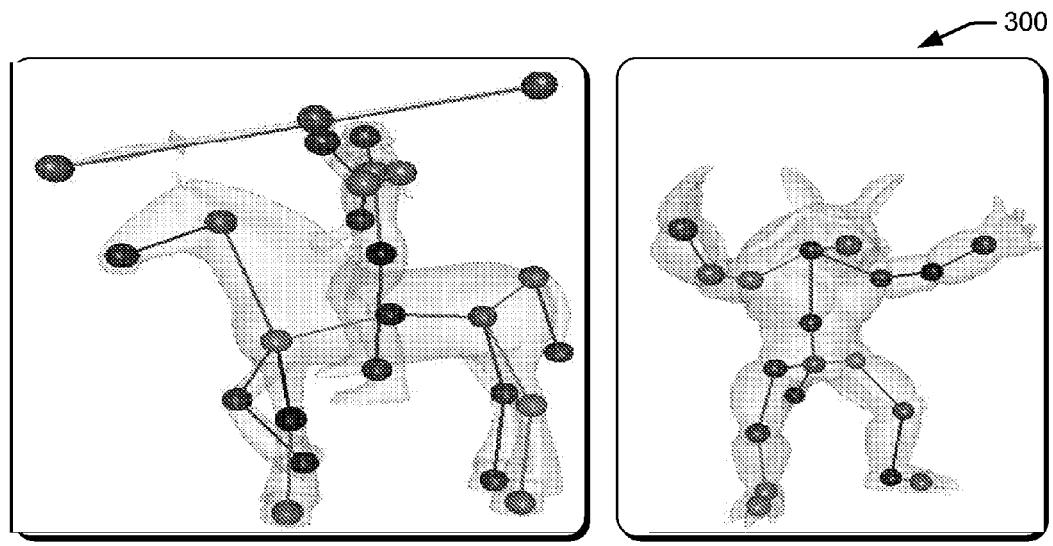
FIG. 3 is a block diagram of exemplary reference meshes and rough skeletons.
Figure 3:
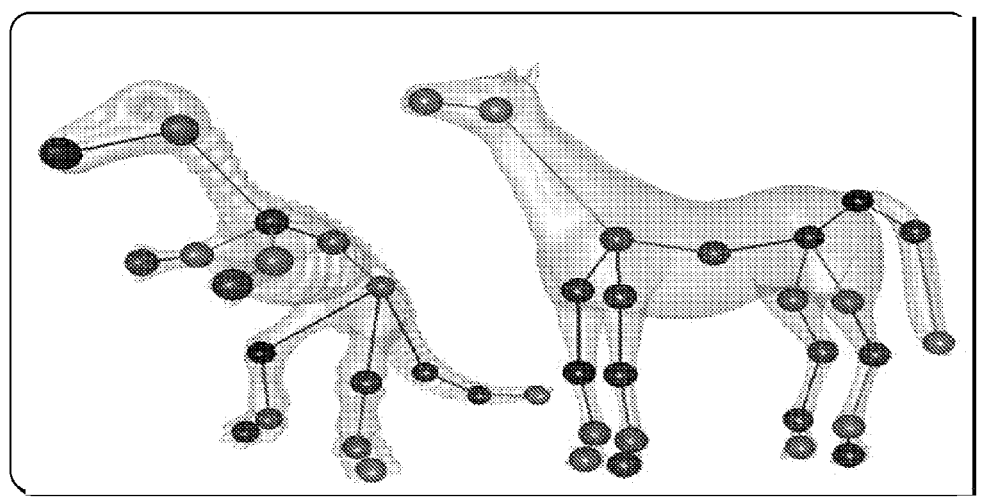

FIG. 3 illustrates exemplary reference meshes and rough skeletons 300 on characters. Shown at reference mesh 302 represents a warrior carrying a spear and sitting on top of a horse. The mesh puppetry application program 106 assumes the user 102 has, as an input, a reference (triangle), mesh M (with V vertices), and a rough skeleton S of the skinned mesh. A graph composing of B bones, shown as nodes. Along with the skeleton, a corresponding partition of the skinned mesh is known so that every vertex associated with bones has the indices of the bones.

With the reference meshes and rough skeleton, the (3D) position of the vertex of the reference mesh $\mathcal{M}$ is denoted by $\bar{x}_i$ and the vector of all these positions by $\bar{X}=\{\bar{x}_i, i \in [1 \ldots V]\}$. Thus, seeking a deformed pose of the reference mesh $\mathcal{M}$, i.e., for another mesh with the exact same connectivity, but a new set of vertex positions is desired, written as $X=\{\bar{x}_i, i \in [1 \ldots V]\}$. To express these mesh coordinates, the traditional skinned mesh setup is used, where the deformation is encoded as one affine transformation $T_b$ per bone, and a B×V matrix of weights $W=\{w_{b,v}, v \in [1 \ldots V], b \in [1 \ldots B]\}$, such that:

$$x_i = \left( \sum_{b \in bones} w_{bi} T_b \right) \bar{x}_i. \qquad (1)$$

Defining each vertex position as a linear combination of the locations where the vertex would be if only following the transformation imposed by a neighborhood bone. If T is the row vector of all matrices $T_b$, the deformed skinned mesh X expressed as $X=TW\bar{X}$.

The matrix W is extremely sparse since the vertex only has blending weights to its associated bone and possibly to the direct neighboring bone(s) if the vertex is near a joint. Reference meshes and skeletons are illustrated in the armadillo 304, a dinosaur 306, and a horse 308. These exemplary reference meshes and skeletons illustrate the manipulation or deformation of skinned meshes in mesh puppetry 106.

Figure 4:
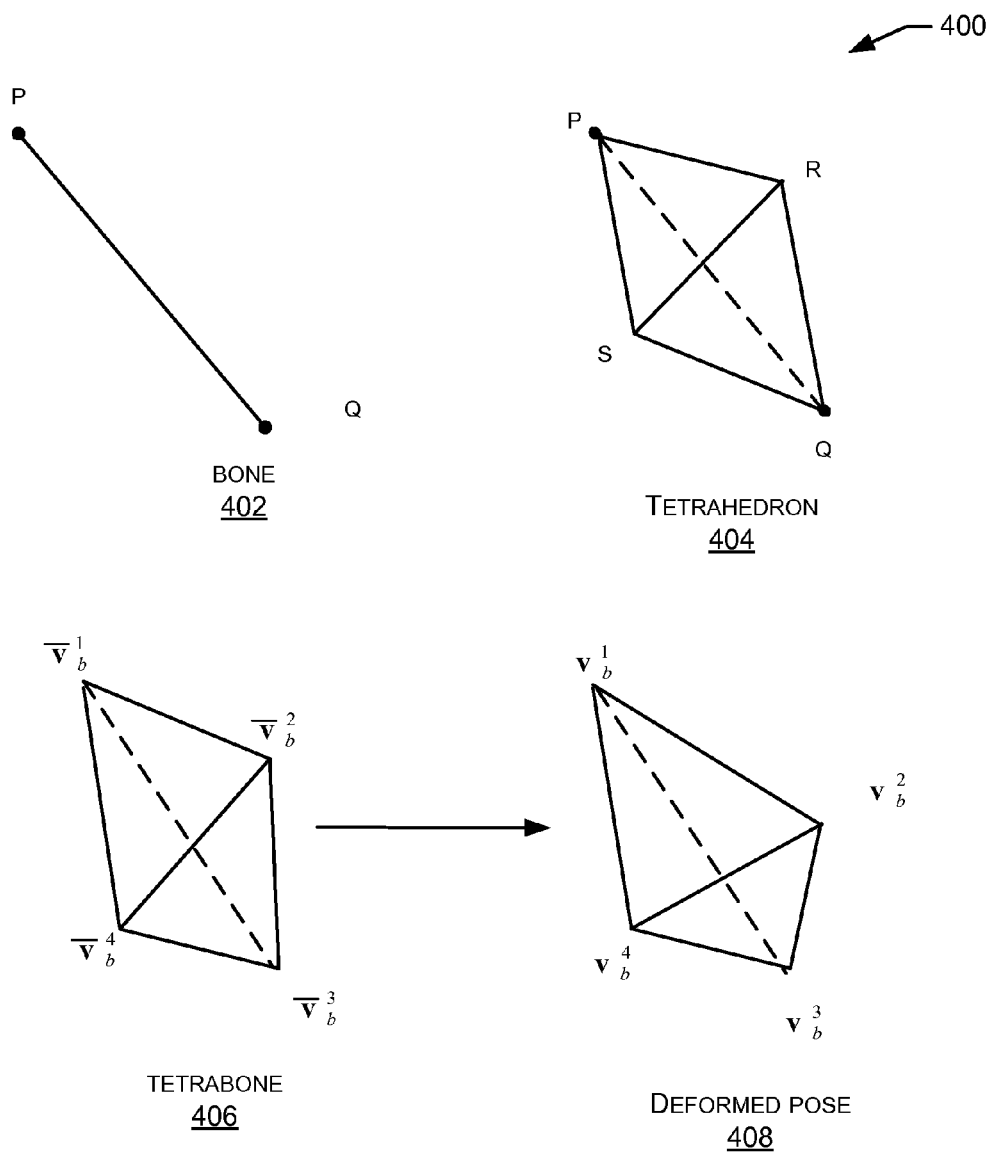
FIG. 4 is a block diagram of a bone transformation exemplary process of FIG. 1.

Turning to FIG. 4, a bone transformation exemplary process 400 is shown. In order to optimize position only (instead of both position and transformation, thus avoiding the use of trigonometric functions in the optimization procedure), each bone is associated to two additional, virtual vertices to create a non-degenerate tetrahedron.

Shown in 402 is an exemplary bone b. The initial construction is trivial: for each bone, an equation can be used b=PQ, where P and Q are considered joints. Shown at 404, introducing two points R and S to the bone, b=PQ, creates a tetrahedron 404 with skinned mesh vertices, P, Q, R, and S. The tetrahedron 404 associated to the bone b 402, is known as a tetrabone $\mathcal{T}$406. The tetrabone $\mathcal{T}$406 has vertices (P, Q, R, and S), which will be called tetravertices $(\bar{v}_b^1, \bar{v}_b^2, \bar{v}_b^3, \bar{v}_b^4)$ to avoid any confusion with the skinned mesh vertices (P, Q, R, and S). FIG. 4 illustrates the bone b 402 and its associated tetrabone $\mathcal{T}$406 in the original pose 406. The tetrabone $\mathcal{T}$406 is in place on the undeformed skinned mesh $\mathcal{M}$406.

Shown in 408 is the deformed pose of the tetrabone $\mathcal{T}$406. The deformed pose 408 causes displacement of the tetravertices $(\bar{v}_b^1, \bar{v}_b^2, \bar{v}_b^3, \bar{v}_b^4)$. The tetravertices $(\bar{v}_b^1, \bar{v}_b^2, \bar{v}_b^3, \bar{v}_b^4)$ can capture any affine transformation $T_b$ that the bone undergoes.

If $\bar{V}_b$ is a matrix with each column being the original homogeneous coordinates (i.e., with 1 as the last coordinates) of the vertices $(\bar{v}_b^1, \bar{v}_b^2, \bar{v}_b^3, \bar{v}_b^4)$, and $V_b$ a similar matrix but now with the homogeneous coordinates of the deformed tetrabone $(v_b^1, v_b^2, v_b^3, v_b^4)$, the following linear relation trivially holds: $V_b = T_b \bar{V}_b$.

Provided that $\bar{V}_b$ is a full-rank matrix (since the initial tetrahedron is regular, thus non-degenerate), the tetrabone is:

$$T_b = V_b \bar{V}_b^{-1} \qquad (2)$$

Substituting Eq. (2) into Eq. (1), the result is:

$$x_i = \left( \sum_{b \in bones} w_{bi} V_b \bar{V}_b^{-1} \right) \bar{x}_i.$$

Thus if defining V as the row vector of all $V_b$ matrices and $\bar{V}^{-1}$ as block-diagonal matrix of all $\bar{V}_b^{-1}$, the skinned mesh setup may be written as a function of only the mesh vertices and the tetravertices:

$$X = V \bar{V}^{-1} W \bar{X} \qquad (3)$$

The mesh puppetry defines the algorithm for the variational problem based on the above setup. Desiring a deformed skinned mesh with vertex positions X (as a function of V and W) such that it minimizes a global deformation energy $\epsilon$:

$$X = \operatorname{argmin} \epsilon(X),$$

$$X = V \bar{V}^{-1} W \bar{X} \qquad (4)$$

where $\epsilon$ encapsulates a set of constraints that the deformation must satisfy. Thus, constraints on tetrabones can be quite powerful at preventing a pose from being grossly distorted or kinematically unnatural.

Constraints

Implementing each constraint by adding an energy term to a global deformation energy. There are inequality constraints (namely, the joint limit and the balance constraints), implemented as conditional energy terms. The first and foremost energy term in the deformation energy is the Laplacian constraint, using Laplacian coordinates to preserve the surface details of the undeformed skinned mesh. Another simple, yet essential constraint is to allow the user 102 to assign a target position for either a mesh vertex or a linear combination of mesh vertices.

The energy term for a position constraint in the custom solver is: solver is:

$$\|AX - \hat{X}\|^2 \text{ with: } AX = \frac{1}{\sum_{j \in I} \alpha_j} \sum_{i \in I} \alpha_i x_i \qquad (5)$$

where I is the set of indices corresponding to the vertices involved, the $\alpha_i$'s are weights, and $\hat{X}$ the target position. This formulation applies for either vertex-position constraints or arbitrary point constraints. Note that these two constraints involve both tetrabones and mesh vertices.

Figure 5:
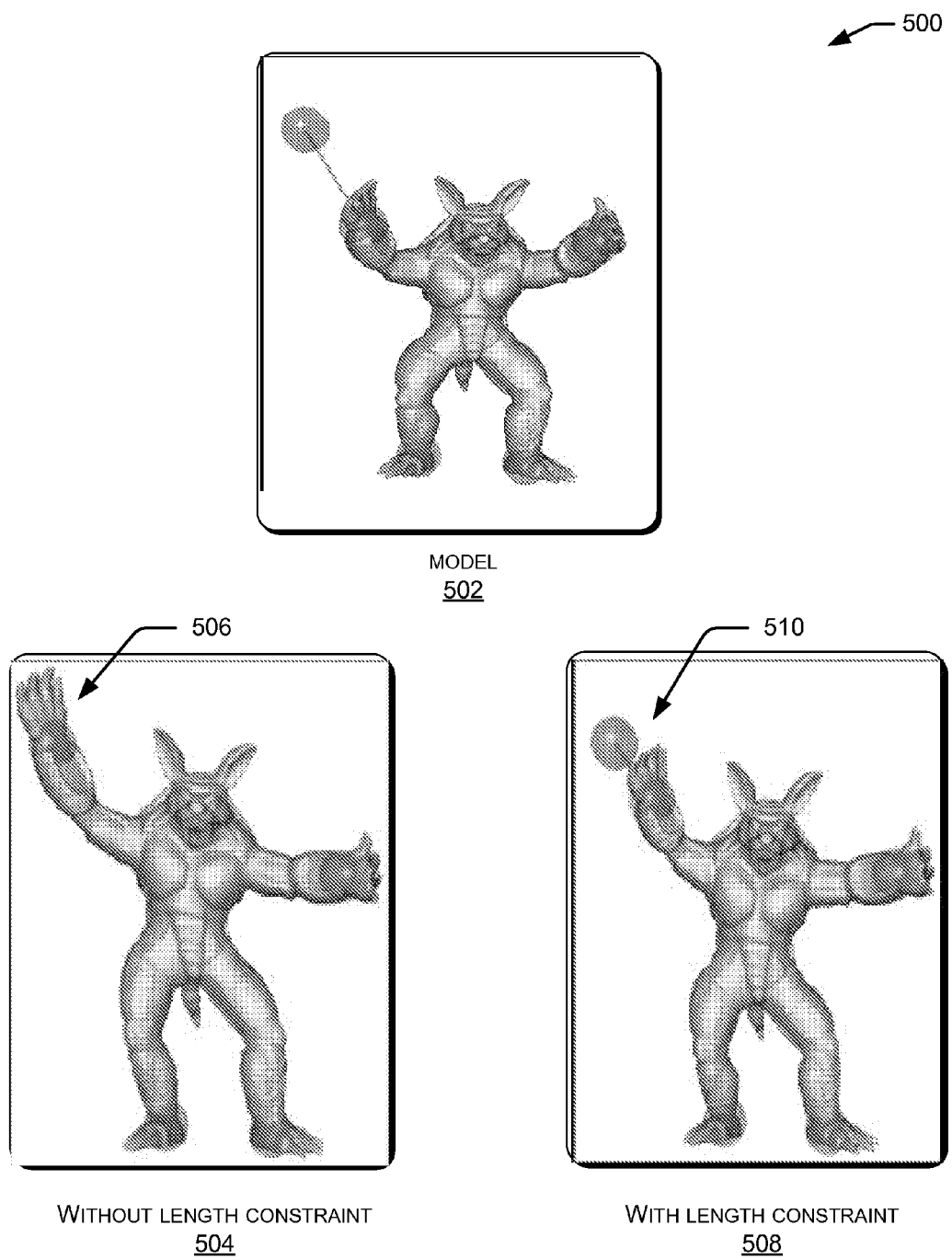
FIG. 5 is a block diagram of exemplary skinned mesh deformations and length constraints.

FIG. 5 illustrates examples of the effects of length constraints on the skinned mesh deformations 500 by comparing two poses, one without length constraint and one with the length constraint, the energy term. The formulation uses the skeleton instead of the skinned mesh; and the custom solver will provide improved convergence rates when dealing with the length constraint.

Controlling the change in length of the bones is particularly useful when dealing with humanoid figures. Implementing the length constraint by adding an energy term of the form:

$$\sum_{(i,j)\in bones} (\|v_i - v_j\| - L_{ij})^2 \quad (6)$$

where $v_i$ and $v_j$ are the position of joints i and j, respectively, and $L_{ij}$ is the original (or more generally, the desired) length of bone (i,j).

Shown at 502, the armadillo is in a model pose with the shot put held in the right hand. The user 102 manipulates the armadillo in 504 by deforming the right hand 506 of the armadillo while the left hand and the feet remain in the same position. The body of the armadillo without length constraint stretches out to fit the point constraint 504. Thus, the size and shape of the body of the armadillo 504 is way out of proportion to the rest of the armadillo body parts, when manipulating without length constraint.

Shown at 508, the user 102 manipulates the armadillo 508 by deforming the right hand 510 of the armadillo while the left hand and the feet remain in the same position. With length constraint, the body of the armadillo results in no stretching and appears o be in proportion for the armadillo 508.

Figure 6:
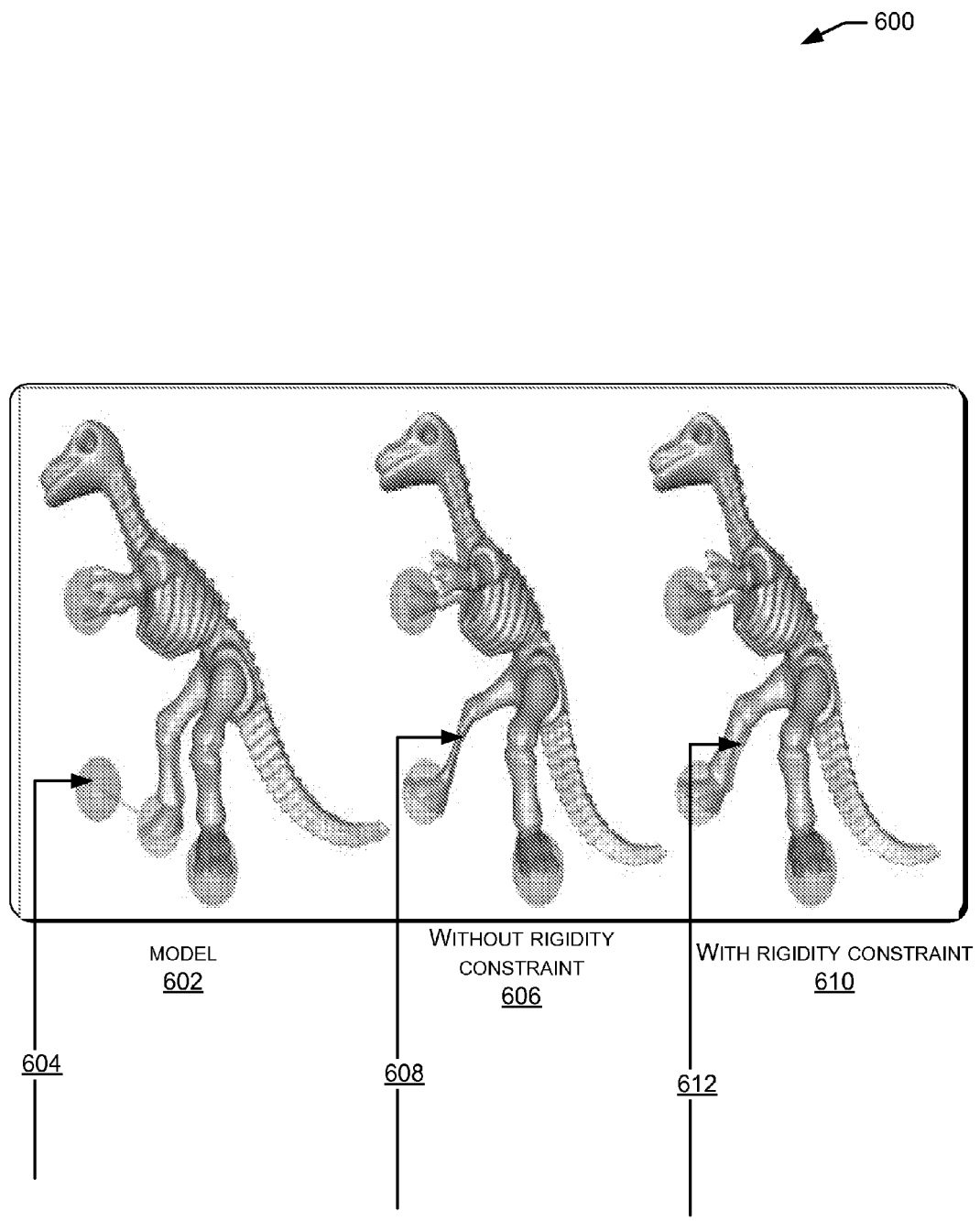
FIG. 6 is a block diagram of exemplary skinned mesh deformations and rigidity constraints.

Turning to FIG. 6 is a block diagram of exemplary skinned mesh deformations and rigidity constraints 600. If one desires to maintain the length of the bone and the skinned around the bones to mostly deform as a rigid object, a stronger version of the length constraint can be used. The stronger version of the length constraint includes one length-based penalty term per tetrabone edge:

$$\sum_{(i,j)\in tetra(b)} (\|v_i - v_j\| - l_{ij})^2$$

where tetra(b) is the tetrabone b, $v_i$ and $v_j$ are the position of tetravertices i and j, respectively, while $l_{ij}$ is the original distance between tetravertices i and j.

This forces each edge of the tetrabone to be of equal length amounts to impose a rigid body transformation of the bone. Thus, the stronger version of the length constraint renders the deformation of each limb as rigid as possible.

FIG. 6 illustrates the effects of the rigidity constraints on the skinned mesh deformations 600 by comparing the poses with and without rigidity constraints. Shown is a dinosaur in the model position 602. The user 102 manipulates the right foot 604 of the model dinosaur 602 while the right hand and left foot remain in the same position.

In 606, without rigidity constraint, the right leg of the dinosaur significantly shrinks 608. Thus, the size and shape of the leg of the dinosaur 608 is not to scale, when deforming without rigidity constraint.

Shown at 610, the user 102 manipulates the right foot of the dinosaur 610 while the right hand and left foot remain in the same position. With rigidity constraint, the leg of the dinosaur 612 results in no shrinking and is to scale for the dinosaur 610.

Figure 7:
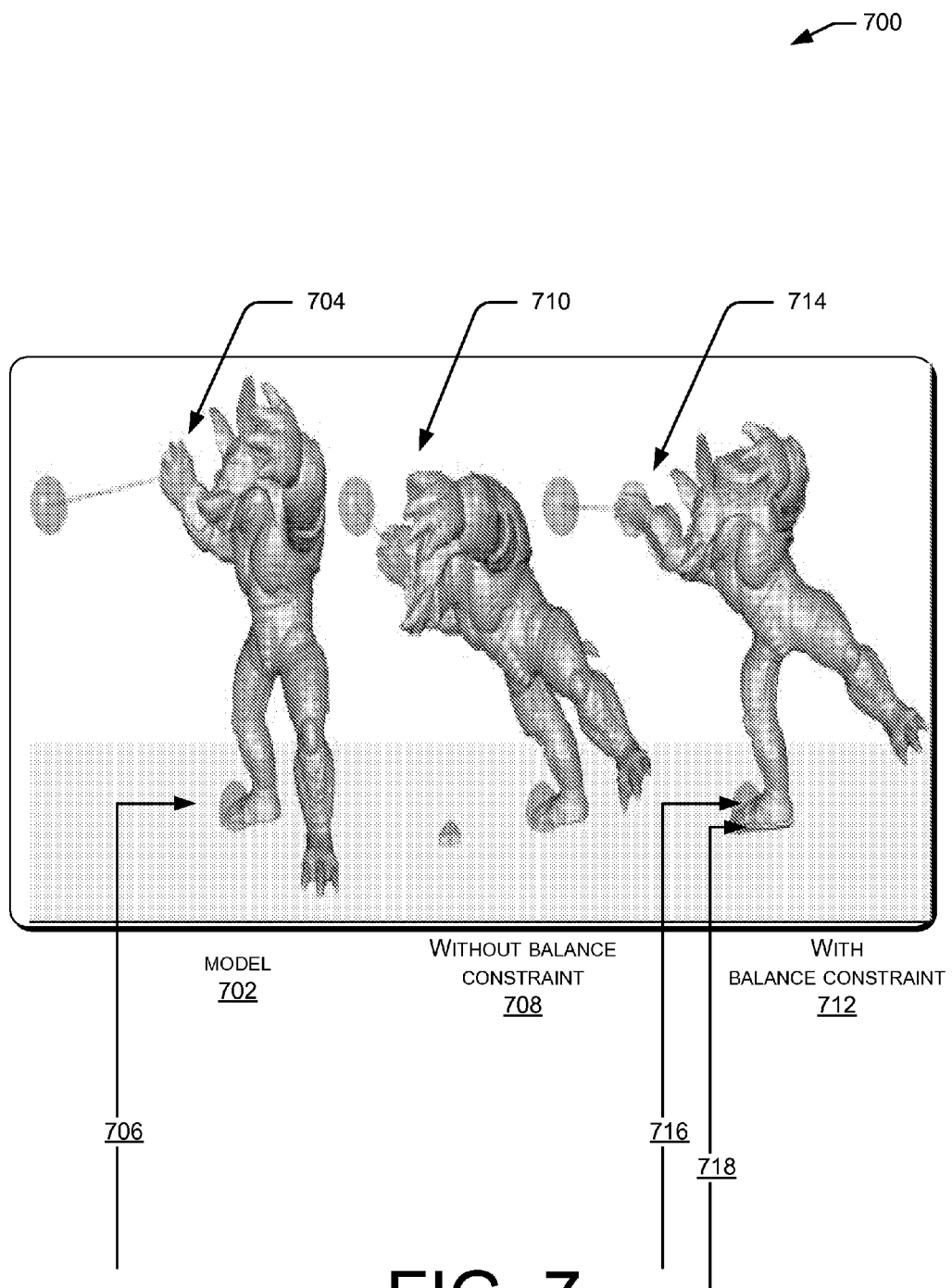
FIG. 7 is a block diagram of exemplary skinned mesh deformations and balance constraints.

FIG. 7 demonstrates the effects of the balance constraints on the skinned mesh deformations 700 by showing the poses with and without balance constraints. Such a simple constraint results in the ability to get natural poses with very little user input. This is a particularly nice tool for mesh puppetry 106 to automatically constrain a new pose to be physically realizable. To keep their balance, humanoid characters must have their center of mass above their supporting area (e.g., above the convex hull of the vertices touching the ground). Enforcing this balance constraint guarantees a well-balanced and visually plausible pose.

The balance constraint achieves this visually plausible pose by forcing the projection of a barycenter (e.g. center of mass) onto the floor to a given position g. Initially, the tool pre-computes the barycenter and estimated "mass" of each bone based on the local volumes of the partition of the skinned mesh in the original pose. The new barycenter, i.e., the center of mass of a deformed pose, will be the mass-weighted sum of these barycenters once the corresponding affine transformations are applied. Implementation of balance constraints adds the following energy term: $\|GV-g\|^2$ where G is a matrix which maps V, using the precomputed or precalculated bone masses and a projection onto a given floor, to the location of the barycenter of the deformed skinned mesh.

A more general balance constraint, where the center of mass is constrained to be over a given (convex) area of the floor, is more helpful for rapid design. Thus, the user 102 may turn this constraint on or off within the custom solver, depending on whether the current center of mass is over the desired area: when activated, the constraint uses a target location g which is the closest point from the current projection on the floor to the desired area.

Illustrated in FIG. 7 is the armadillo in the model position 702. The user 102 drags the right hand 704 of the armadillo 702 with the right foot held fixed 706.

Illustrated at 708, the user 102 manipulates the right hand 710 of the armadillo 708 without using balance constraints. The armadillo 708 seems to lean excessively, an indication of losing one's balance.

Shown in 712, the user 102 manipulates the right hand 714 of the armadillo 710 using balance constraints. The armadillo 712 leans naturally forward with its body while trying to reach the target point. Also, the armadillo 712 raises its left leg naturally backward to keep its balance. The small sphere located on the floor shows the projection of the center of mass onto the floor 716, while the smaller sphere shows the target position of barycenter 718 at the border of the polygon (demarcating the supporting area).

Figure 8:
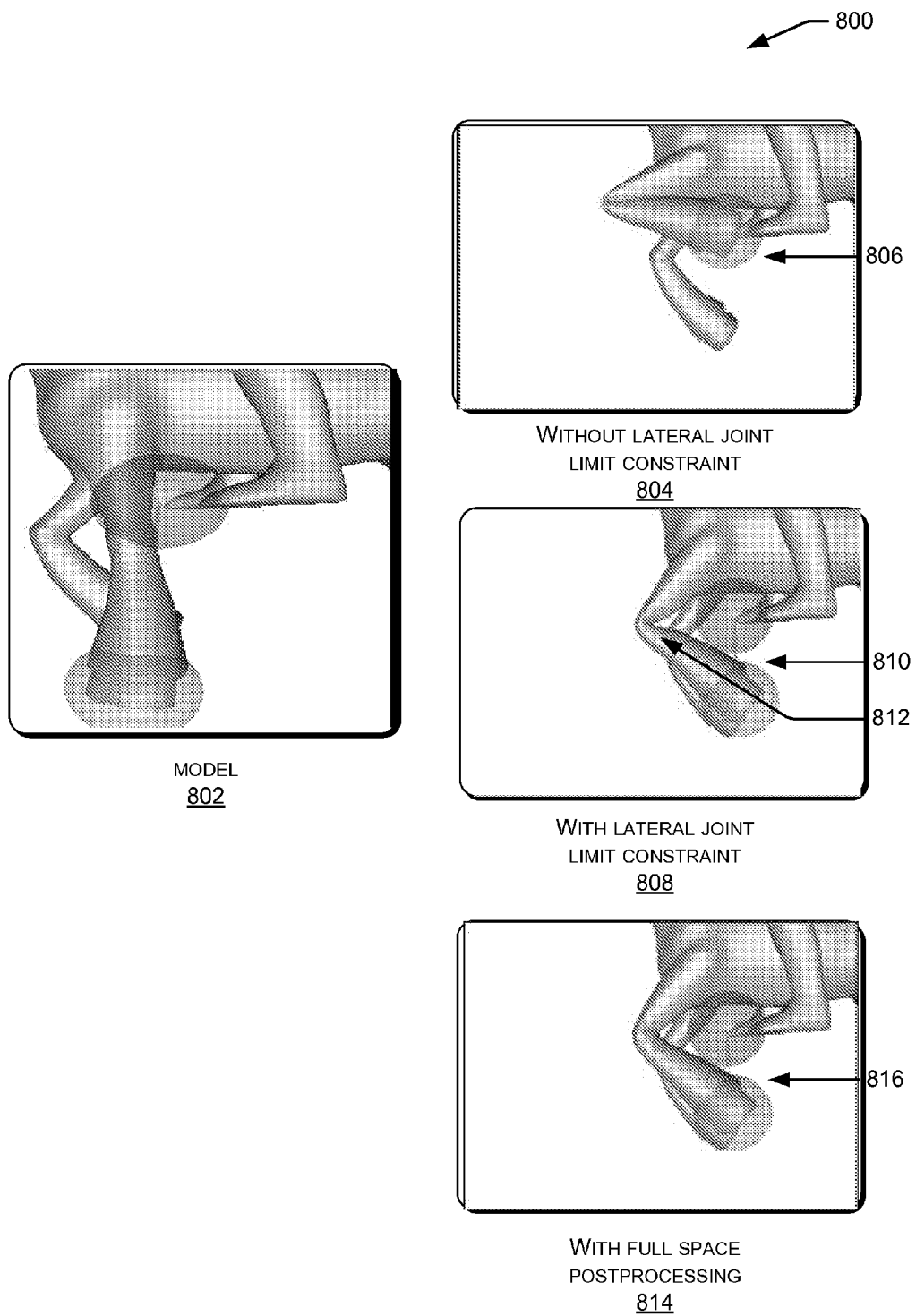
FIG. 8 is a block diagram of exemplary skinned mesh deformations, lateral joint limit constraints, and full space postprocessing.
Figure 9:
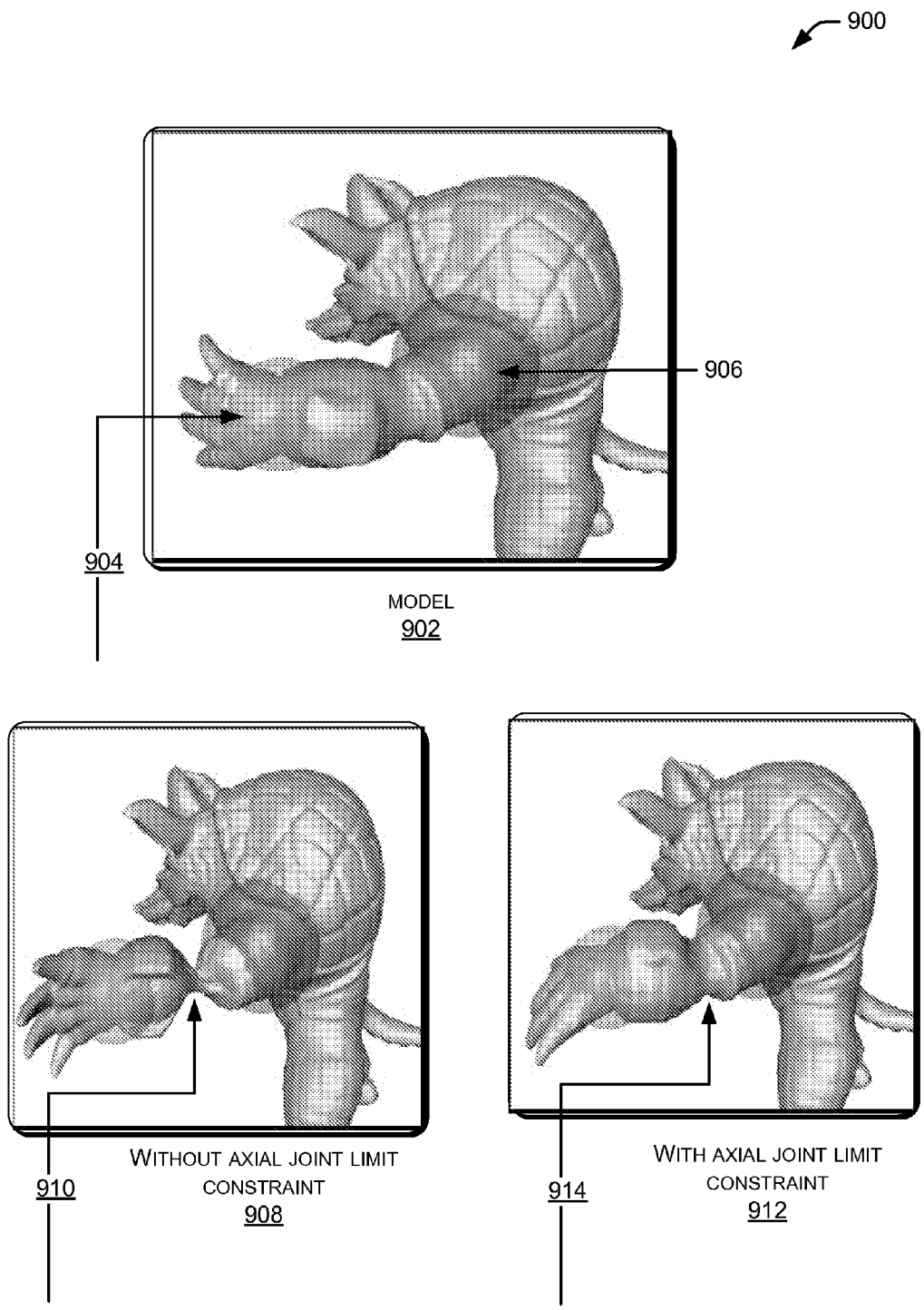
FIG. 9 is a block diagram of exemplary skinned mesh deformations and axial joint limit constraints.

FIGS. 8 and 9 illustrate the effects of joint limit constraints on the skinned mesh deformations. FIG. 8 illustrates the joint limit constraints imposed laterally (rotation) and FIG. 9 illustrates the joint limit constraints imposed axially (twisting).

Joints of skeletal structures often have restricted ranges. Introducing an energy term to the minimization process that enforces joint limit constraints prevents unnatural looking results. By simply constraining the distances between their corresponding tetravertices controls the relative orientation between two adjacent bones. For two bones $b_1$ and $b_2$, if a joint angle is exceeding the prescribed limit, a term of the form may be added:

$$\sum_{(i,j)\in pairs(b_1,b_2)} \|(v_i - v_j) - \theta_{ij}\|^2$$

where $v_i$ and $v_j$ are the position of tetravertices from each bone, and $\theta_{ij}$ is the target vector between them to enforce the correct limit angle; pairs (b1,b2) denotes the few pairs of tetravertices of b1 and b2 required to resolve the joint limit currently violated. The pairs involved in this energy term depend on whether the joint limit is imposed laterally (rotation), or axially (twisting).

Turning to FIG. 8, the effects of the lateral (rotation) joint limit constraints on the skinned mesh deformations 800 by showing the poses with and without lateral joint limit constraints. Shown is a hoof of a horse in the model pose 802. In 804, the user 102 drags the hoof of the horse up 806. Without lateral joint limit constraint, the skinned mesh self-intersects with the foot as shown at 806.

Shown in 808, the user 102 drags the hoof of the horse up 810. Using lateral joint limit constraint prevents the foreleg of the horse from bending too much, shown at 810. However, the joint of the foreleg of the horse appears collapsed 812. Thus, a drawback is that the SSD-based approach can suffer from the "collapsing joint" effect for extreme poses, as shown in 812.

The optimization procedure heavily benefits from the fact that this is a skinned mesh. However, a major shortcoming of all SSD methods is that excessive deformation can result in the collapse of joint regions, as shown at 812. Thus, adding a final phase to rectify the vertex positions around the joints helps in producing high quality results.

This final phase occurs by further optimizing the vertex positions directly in full space (as opposed to the subspace where constrain occurred to via vertex blending while satisfying the IK constraints). For each bone, the vertices with a single weight of 1 (i.e., most of the vertices) are maintained fixed. The rest of the skinned mesh (i.e., the vertices around joints) is automatically deformed. Specifically, a harmonic field of the transformations is first used to modify the Laplacian coordinates of the joint vertices, then the final, deformed skinned mesh is solved so that these joint vertices satisfy the Laplacian coordinates. Since this postprocessing is only performed on the vertices near joints, the added overhead is insignificant.

Shown in 814 is the full-space post processing of the vertices near the joints. With this post processing, the foreleg of the horse looks natural while the lateral angle limit is still maintained 816. When high quality results are desired, this full-space post processing phase rectifies the vertex positions around joints.

Turning to FIG. 9, which illustrates the effects of the axial (twisting) joint limit constraints on the skinned mesh deformations 900 by showing the poses with and without axial joint limit constraints. Shown is an arm of the armadillo in the model pose 902. The user 102 twists the arm 904 of the armadillo while holding the shoulder fixed 906.

Shown at 908 without axial joint limit constraint, upon manipulating the arm of the armadillo, the arm twists excessively 910 looking unrealistic. With the axial joint limit constraint in 912, twisting of the arm of the armadillo is automatically limited, and the arm looks natural as shown in 914.

Custom Solver Through Cascading Optimization

Figures 10A, 10B:
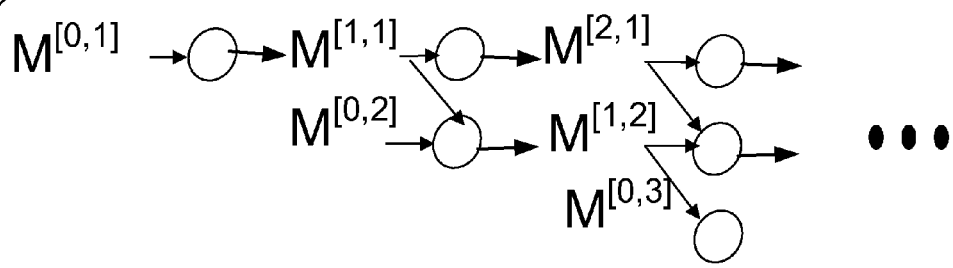
FIG. 10($a$) is a schematic diagram showing an exemplary custom solver and FIG. 10($b$) is a schematic diagram showing an exemplary cascading optimization procedure.

Illustrated in FIG. 10(a) is an exemplary custom solver. Describing the different energy terms, the user 102 could directly apply a nonlinear solver (such as SQP) to the total energy in order to solve for the deformed skinned mesh. Given the number of unknowns involved in the solve, this turns out to be quite a herculean task for large skinned meshes—preventing any hope of real-time manipulation.

The optimization procedure exploits the structure of the problem to optimize efficiency. A deformed pose may be written as $X = V\bar{V}^{-1}W\bar{X}$, such that X minimizes the energy functional defined. Optimizing for V and W simultaneously is intractable, due to the number of unknowns involved and the highly nonlinear nature of the total energy $\epsilon$. In order to reach interactive speed at least for moderately large skinned meshes, a custom optimization scheme is used.

Two alternating phases are used in the optimization procedure. First, X is a linear function of V when W is held fixed, and a linear function of W when V is fixed. That is, finding the optimal deformed skinned mesh by alternating between optimizations of V with W fixed and of W with V fixed: each optimization phase is still a nonlinear problem, but with significantly less variables. For example, the optimization describes V only as a V-phase and W only as a W-phase.

Note that some constraints involved in the optimization are more stringent than others; while the position constraint alone can be optimized through a simple linear solve, the other constraints are nonlinear, and the balance and joint limit constraints are inequality constraints. Moreover, constraints can be conflicting: some deal with detail preservation, while others control large-scale deformation. The mixed nature of these constraints makes any brute-force numerical attempt to optimize the total objective function in the V-phase inefficient. Thus, the cascading objective optimization method adds objective increments in cascade to the optimization procedure to accelerate convergence.

Contrary to the V-phase, the W-phase contains very few constraints (only the Laplacian, position, and smoothness constraints) that are straightforward to minimize. Hence, a traditional iterative method optimizes this objective function.

Note finally that every iteration performed during this optimization procedure (be it for the V-phase or the W-phase) consists of a simple linear solve: as in the Gauss-Newton method. Thus, the nonlinear optimization occurs by using repeated quadratic approximations. FIG. 10(a) illustrates this solver.

V-Phase: Cascading Objective Optimization

FIG. 10(b) illustrates an exemplary cascading algorithm. In particular, the V-phase is devised to optimize the affine transformation (via the positions V of the skeleton's tetrabones) applied to each skeleton bone, in order to minimize the objective function containing (some of, or) all the constraints mentioned previously. Dividing the V-phase into several threads, causes increasingly-constrained optimizations to perform in parallel. Instead of using all the constraints at once, a first thread evolves the skinned mesh from its current shape towards satisfying only the most basic constraints. In parallel, a second thread of optimization uses the results of the first thread as initial conditions, and an objective function including the basic constraints plus one more constraint, and the like.

This may, at first glance, seem like a lot of additional operations to perform compared to a regular optimization of the total energy; but optimizing fewer constraints is very efficient, and a more-constrained optimization will greatly benefit from the results of a less-constrained optimization. This cascading approach accelerates convergence significantly, and is easy to implement on multiple processors. A byproduct of this cascading increment-objective approach is that the terms in earlier threads are better minimized, which allows to define the order in which constraints are added according to their respective importance. Note that the idea of adding constraints includes concurrent threads which feed on each other to accelerate convergence.

Accomplishing each optimization step occurs by taking only partial sums of quadratic approximations of the various constraint energies, making use of the results of earlier steps to guide later steps. There are five threads of the cascading optimization procedure. The optimization result from the m-th state of thread k as $\mathcal{M}^{[m,k]}$, which contains the positions of all the mesh vertices $X^{[m,k]}$ and of all the tetravertices $V^{[m,k]}$. As shown in the algorithm in FIG. 10(b).

Implementing Laplacian constraint by adding the following energy term into the deformation energy:

$$\epsilon_1(m,k) = \|LX^{[m,k]} - \hat{\delta}X^{[m-1,k]}\|^2 \quad (7)$$

where $\hat{\delta}X^{[m-1,k]}$ is defined as:

$$\hat{\delta}X^{[m-1,k]} = \frac{LX^{[m-1,k]}}{\|LX^{[m-1,k]}\|} \|L\bar{X}\|$$

where $\bar{X}$ is the mesh in rest pose.

This means using the Laplacian coordinates of the previous result of the same thread as the target direction, while taking the magnitude of the original Laplacian coordinates as the target magnitude. This is simply a linearization of the Laplacian constraint energy term, which will therefore help preserving the surface details of the undeformed skinned mesh.

Deformation Results with Constraints Added

Figure 11:
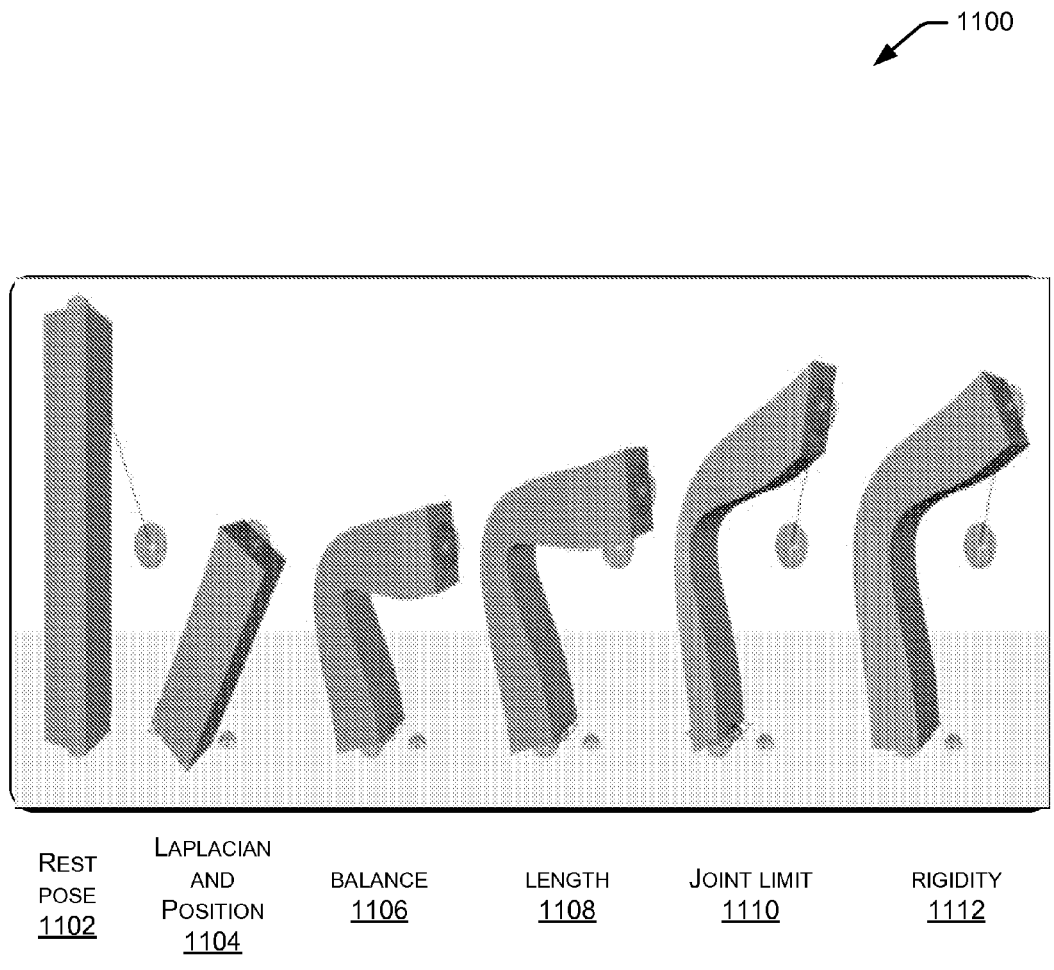
FIG. 11 is a block diagram of exemplary deformation results of each thread for a two-link rod-like mesh with various constraints of FIG. 10.

FIG. 11 illustrates the exemplary deformation results of each thread for a two-link rod-like mesh with various constraints added to the process. The final thread contains all the desired constraints, and will result in the final, deformed mesh. Shown are the final states of each thread: a rest pose 1102, Laplacian and position constraints 1104, balance constraint 1106, length constraint 1108, joint limit constraint 1110, and rigidity constraint 1112.

Implementation of position constraints 1104 adds:

$$\epsilon_1(m,k) += \|AX^{[m,k]} - \hat{X}\|^2,$$

where $A$ and $\hat{X}$ are defined in Eq. (5) to impose the desired point-constraints on top of detail preservation.

To deal with the balance constraint 1106, one conducts a test to determine whether the current barycenter lies over the desired region. This test uses the matrix G by checking $GV^{[m,k-1]}$. If the constraint must be activated, add the following energy term:

$$\epsilon_2(m,k) = \|GV^{[m,k]} - g^{[m,k-1]}\|^2$$

where $g^{[m,k-1]}$ is the closest point from the center of mass of $\mathcal{M}^{m,k-1}$ to the supporting area.

Implementation length constraint 1108 by adding the following energy term:

$$\varepsilon_3(m, k) = \left\| \left(v_i^{[m,k]} - v_j^{[m,k]}\right) - \frac{v_i^{[m,k-1]} - v_j^{[m,k-1]}}{\|v_i^{[m,k-1]} - v_j^{[m,k-1]}\|} L_{ij} \right\|^2,$$

which corresponds to a linearization of the deformation energy around the previous result. This implementation, differs by the fact that the direction of the bones is guided by the deformation result of the previous thread, and not the deformation result from the previous iteration of the same thread. The difference is significant: impairing the convergence rate by trying to maintain the directions of the last iteration. Instead, this implementation relies on the result of the previous thread, versus using the length constraint. As a result, on a rotating bone, the length-constraint algorithm converges more than one order of magnitude faster.

Figure 12:
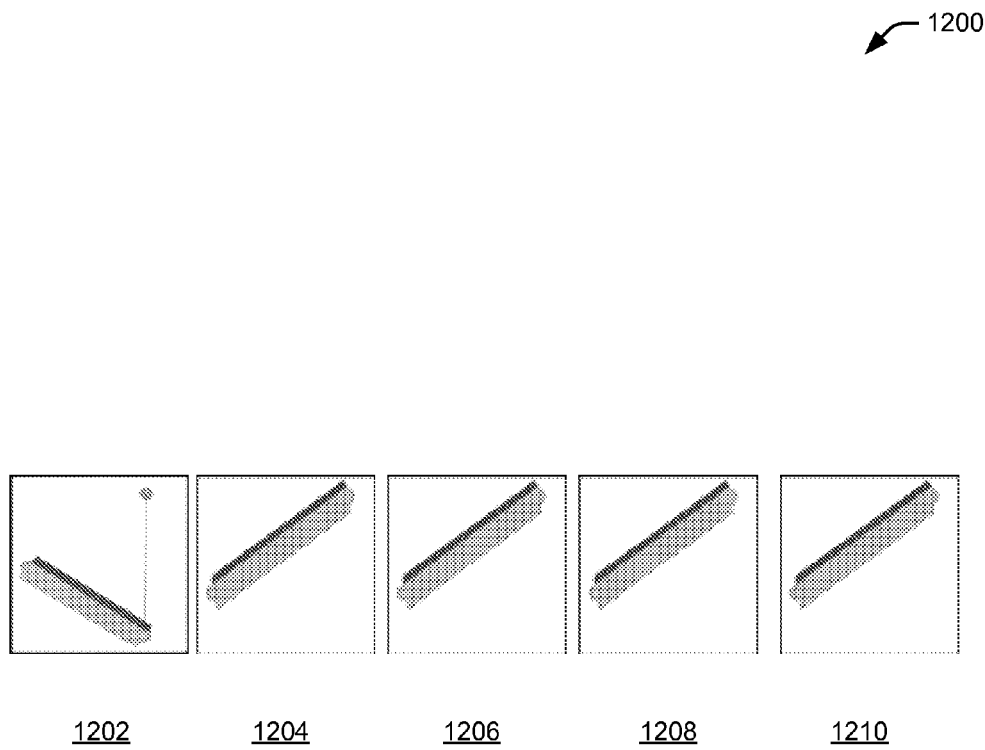
FIG. 12 is a block diagram of exemplary convergences for length constraints.
Figure 12:
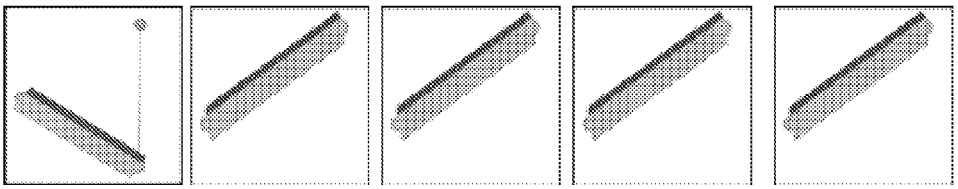

FIG. 12 illustrates an exemplary convergence of length constraints 1200. For example, the user 102 tries to rotate a rod-like mesh through a position constraint. As a result, the length constraint converges in a five iterations. Shown is the rod-like mesh in a rest pose 1202. The rod-like mesh goes through different states. Shown are a second state in 1204, a third state in 1206, a fourth state in 1208 and a fifth state in 1210. These figures illustrate that the direction of the bones are guided by the deformation result from the previous iteration of the same thread, thus converging in five iterations. This convergence measures an average improvement factor of 30 on complex models for this particular energy optimization.

Figure 13:
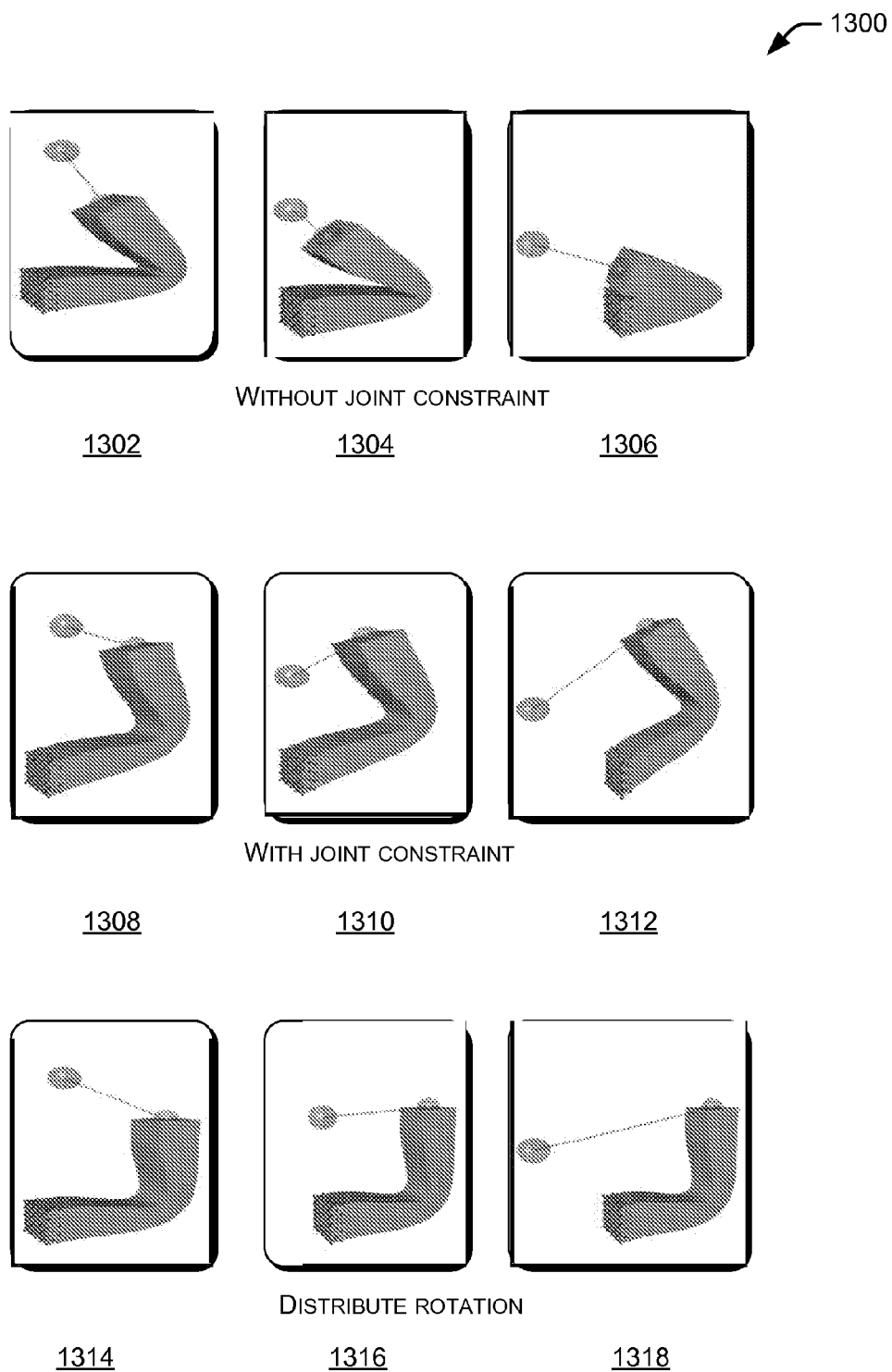
FIG. 13 is a block diagram of exemplary two-link rod-like meshes with joint limit constraints.

Turning to the discussion of joint limit constraint 1110. FIG. 13 is a block diagram of exemplary two-link rod-like meshes with and without joint limit constraints 1300. A determination evaluates whether to activate the joint limit constraint for each constrained joint in the skeleton. This includes determining if the relative orientation between the two consecutive bones at the joint in its current state (encoded by $V^{[m,k-1]}$) is beyond the imposed angle limits. Joint limits are specified as a subset of SO(3), of the unit quaternion ball, or as ranges of Euler angles. If the relative orientation is beyond the imposed angle limits, the joint limit constraint is activated.

For the two bones b1 and b2 adjacent at the joint, implementation of the joint limit constraint occurs by adding the following energy term into the deformation energy:

$$\varepsilon_4(m, k) = \sum_{(i,j) \in pairs(b_1, b_2)} \|(v_i^{[m,k]} - v_j^{[m,k]}) - \theta_{ij}^{[m,k-1]}\|^2,$$

where $\theta_{ij}^{[m,k-1]}$ is the target vector (i.e., distance and direction) between tetra-vertices to enforce joint limit.

The three possible degrees of freedom for a joint describe the direction that b2 is along (2 DoF's) and by how much how much $b_2$ is twisted, relative to $b_1$. If the limit of the former violates, align $b_2$ to the closest direction that does not violate the limit by aligning $v_i - v_j$ to $\theta_{ij}$, where i and j are the two vertices of the bones not shared by each other. If the latter limit exceeds, align the displacement between the virtual vertices of $b_2$ (and/or $b_1$) to a direction that satisfies the twist angle limit. To determine the closest directions within joint limit, rotate both bones to change their relative orientation.

FIG. 13 is a block diagram of exemplary two-link rod-like meshes with and without joint limit constraints 1300. Shown is a two-link rod-like mesh in the model pose 1302. The user 102 bends one end and the other end is held in the same position 1304. Without joint limit constraint, the fixed end never rotates 1306.

Shown in 1308 is the model pose. The user 102 bends one end and the other end is held fixed in the same position 1310. With joint limit constraint, a naive approach to derive a target direction during the optimization can lead to an undesired rotation of the link with the fixed end 1312.

Shown in 1314 is the model pose. In order to get more balanced results, instead of fixing one of the bones or distributing the rotation evenly to both bones, distribute rotation proportionally to changes in the direction of the two bones in the previous thread, as it indicates the susceptibility of each bone to rotation. Thus, the two-link rod-like mesh illustrates rotation distributed proportionally 1316 to changes in the direction of the two-link rod-like mesh in the previous thread. Using this approach to get the target direction, the fixed end does not rotate 1318, behaving as expected. This figure illustrates how the simple strategy described gives very natural results 1318.

Figure 14:
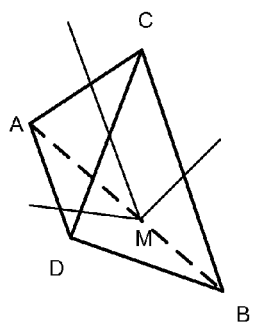
FIG. 14 is a block diagram of exemplary virtual vertices and rigid constraints.
Figure 14:
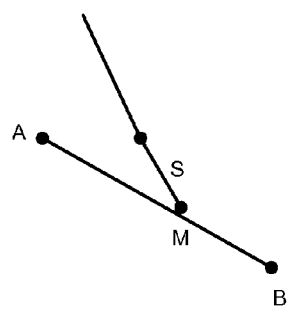
Figure 14:
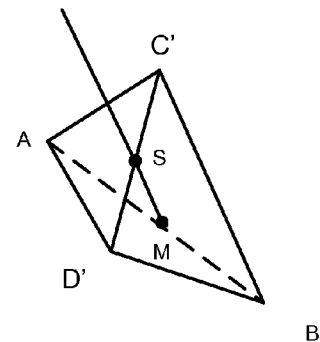

Turning to FIG. 14, which illustrates placing virtual vertices 1400 in rigidity constraint 1112. Rigidity constraint is added, for each bone b, with the following energy term into the deformation energy:

$$\varepsilon_5(m,k) = \sum_{(i,j) \in tetra(b)} \|(v_i^{[m,k]} - v_j^{[m,k]}) - d_{ij}^{[m,k-1]} l_{ij}\|^2,$$

where tetra(b) is the tetrahedron of bone b, $d_{ij}^{[m,k-1]}$ gives the target direction and $l_{ij}$ gives the target length as defined in Eq. (6).

Many possible target directions can be used. The aim is to keep the directions of the bones affected as little as possible, the following approach provides the best results. Instead of obtaining the direction through polar-decomposition, which may undesirably change the directions of bones, simply move the two virtual vertices to positions that make the tetrabone regular while maintaining the bisector of the dihedral angle of the bone itself.

Illustrated in FIG. 14 are the position of the four tetra-vertices A, B, C, and D resulting from the previous thread 1402. The first item is to determine the bisector of the dihedral angle formed by the bone AB and its two neighboring faces that goes through AB's midpoint M as shown at 1402.

Next in 1404, determine a point S on the bisector such that |ms|=2|ab| 1404. In 1406, find C' and D' such that SC' and SD' are perpendicular to both AB and MS with their lengths being one half of |ab| 1406. The vertices C' and D' are used as the new positions of the virtual vertices.

W-Phase: Direct Optimization of Vertex Weight Constraints

Implementing smooth dependence of the vertices on the transformation of the bones occurs by adding an energy term that penalizes strong local variations of the skinned weights. This smoothness constraint, dependent only on W follows:

$$\sum_{w_{bi} \in W} \left( w_{bi} - \frac{1}{|\mathcal{N}(i)|} \sum_{j \in \mathcal{N}(i)} w_{bj} \right)^2 + \sum_{i \in [1 \ldots V]} \left( \sum_{b \in B} w_{bi} - 1 \right)^2 \quad (8)$$

where i is the index of the vertex, b is the index of the bone and $\mathcal{N}$(i) is the one-ring neighborhood of vertex i.

The first term of this energy effectively tries to annihilate the biLaplacian of the weights (by minimizing the Laplacian squared), a well-known way to regularize a scalar field. The geometric Laplacian matrix of the original mesh is not used to avoid any numerical issue due to negative cotangents. Instead, using the graph Laplacian, as it suffices to make the weights well-behaved without creating geometric artifacts. Notice that this smoothness constraint also takes care of the usual overfitting issues.

The last term of the energy is added to get the weights of the vertices around the joints to form a partition of unity. Although this condition is unnecessary for static poses, getting to be close to a unit sum for each vertex's weights will guarantee that if a rigid transformation is applied to the skeleton during modeling, the vertices will follow rigidly and thus will require no optimization.

The W-phase does not require any specific treatment as the constraints are much milder. Therefore, using one thread and a quadratic objective function to minimize is simply set to:

$$\varepsilon = \|LX^{[k]} - \delta X^{[k-1]}\|^2 + \|AX^{[k]} - \hat{X}\|^2 +$$

-continued $$\sum_{w_{bi} \in W} \left( w_{bi} - \frac{1}{|\mathcal{N}(i)|} \sum_{j \in \mathcal{N}(i)} w_{bj} \right)^2 + \sum_{i \in [1 \ldots V]} \left( \sum_{b \in B} w_{bi} - 1 \right)^2.$$

Notice that this energy includes only the constraints involving W (i.e., the Laplacian, position, and smoothness constraints).

Figure 15:
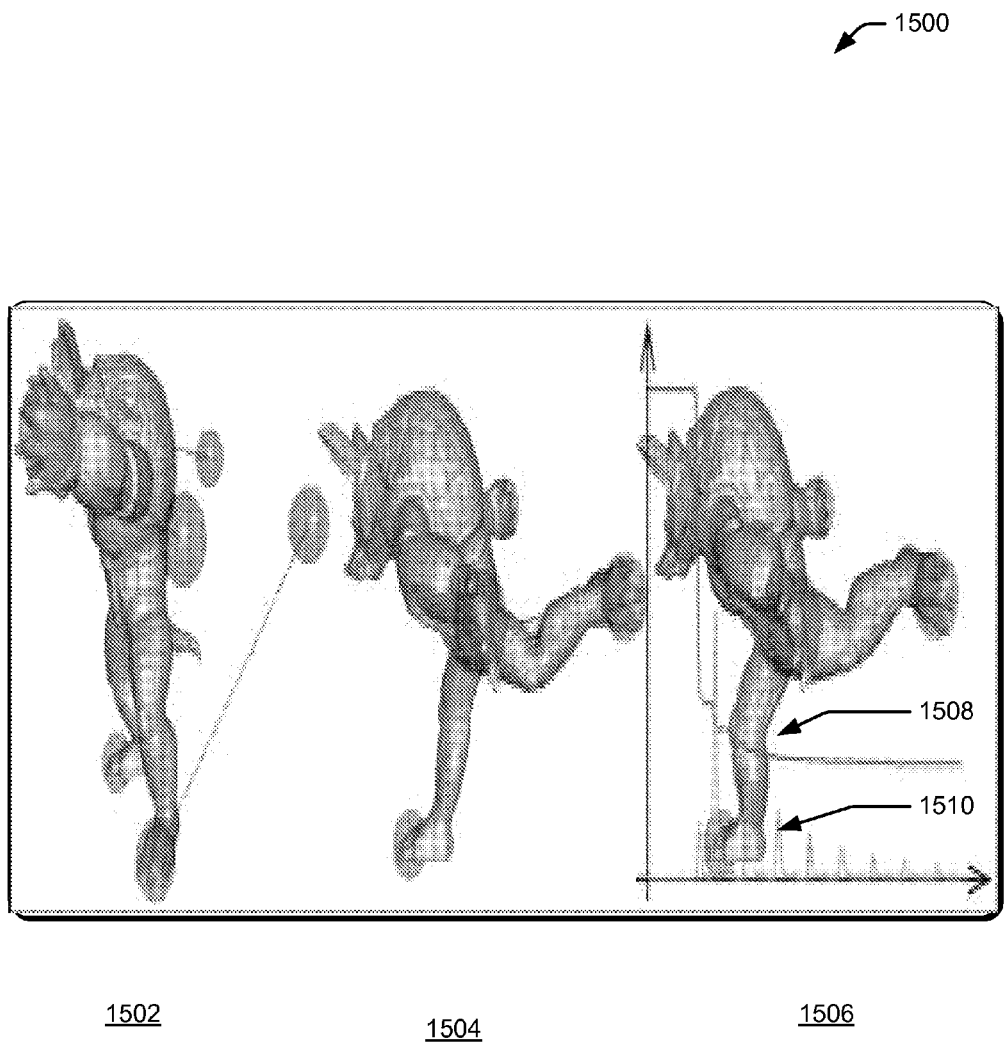
FIG. 15 is a block diagram of exemplary optimizing vertex weights.

FIG. 15 shows how optimizing vertex weights reinstates the shape and details of the skinned mesh 1500. The armadillo is in the model pose 1502. The armadillo is deformed to look like a sprint athlete on the finishing line. The arm and legs exhibit distortion after the V-phase 1504. After optimizing vertex weights, the arm and legs recover their shape 1506. The curve sphere 1508 located near the head, shoulders, and arm show the deformation energy, while the lower curve located near the legs and feet 1510 shows the L2 norm of the distance between two consecutive meshes during the optimization.

Applications and Results

The implementation of the two-phase cascading solver is fast enough to allow direct manipulation of moderately large meshes (50K vertices) in real-time. This may be implemented for example on a dual-core Pentium 4 PC. Notice that having all five threads concurrently only slows down each step of the optimization by 60% compared to solely enforcing Laplacian and position constraints (i.e., a single thread), demonstrating that the cascading approach makes efficient use of each thread's progress to help the following threads. The temporal coherency of the mouse position throughout the design of new skinned mesh poses results in quick convergence of the various threads, as the difference between two consecutive poses is often small.

For larger skinned meshes, reducing the number of threads to three during real-time interaction, running the full five threads only as a final, polishing phase when the user 102 stops dragging the skinned mesh around. Larger skinned meshes can even be first simplified via mesh decimation for their interactive manipulation, then finalized through optimization initialized with the optimal pose of the simplified mesh. It may require from 5 to 10 iterations for the V-phase to converge, while it usually takes 2 to 5 iterations for the W-phase. Recommend an average scheduling for these two alternating phases. Finally, weighting of various deformation energies can be used as a further tool to "tailor" the way models react to constraint, i.e., to define an implicit prioritization of the constraints.

To validate the efficiency of our cascading approach, a brute-force solver was implemented that minimizes the total energy directly via repeated Gauss-Newton iterations. That is, each iteration of the brute-force minimization is exactly the same computational complexity as the last thread. However, the cascading approach pays off nonetheless: the convergence time for a deformation of the armadillo (30K vertices) is 0.45 seconds, compared to 17 seconds for the brute-force way. The difference in timings is explained by the huge discrepancy in iterations needed for convergence: the method converges in 10 iterations of the cascading solver, while the brute-force solving requires over 1000 iterations. The total timings are dramatically improved.

This level of interactivity, along with the numerous design constraints introduced (automatic balancing and most-rigid constraints in particular), makes this interactive mesh deformation framework a true mesh puppetry workshop: the user 102 can easily manipulate an inanimate skinned mesh to create natural, life-like poses in no time, and our position constraint, when used with length and balance constraints, is very similar to a puppeteer pulling the strings of her puppet.

Rather than handling individual models, the system can naturally support simultaneous deformation of multiple objects. With the features defined, complex deformation tasks on multiple objects can be defined efficiently and intuitively.

Figure 16:
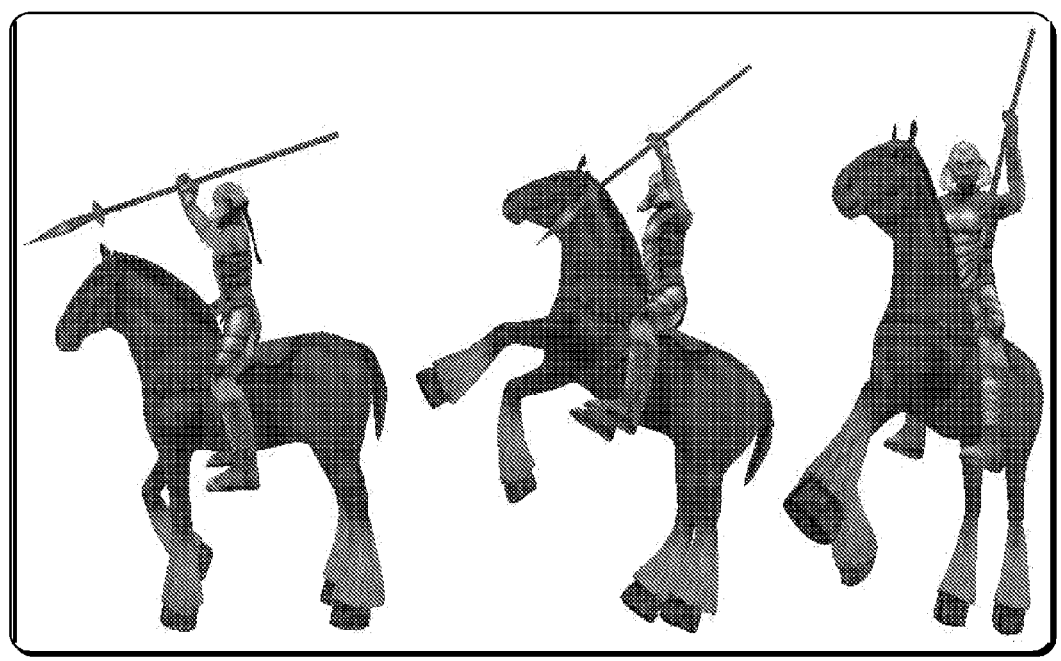
FIG. 16 is a block diagram of exemplary deformation of multiple objects.

FIG. 16 illustrates deformation of multiple objects 1600. In particular, relative positions of objects can be easily maintained or adjusted through common point constraints. Shown is an equestrian model consisting of three parts: a horse, a warrior, and a spear 1604. The warrior is glued onto the saddle of the horse and the spear is glued into the warrior's left hand. A balance constraint is applied to the warrior, with his hips set as supporting area. The joint limit constraint is applied to the wrist to prevent it from bending too much.

The user 102 can then raise the body of the horse 1604. Thus, the warrior will automatically lean forward in order to stay on the horse and maintain a natural balance. The warrior automatically leans forward to keep his balance on the saddle when the horse is moved 1602. Editing is performed by manipulating the horse's forelegs, the warrior's head and the direction of the spear 1604 and 1606.

Figure 17:
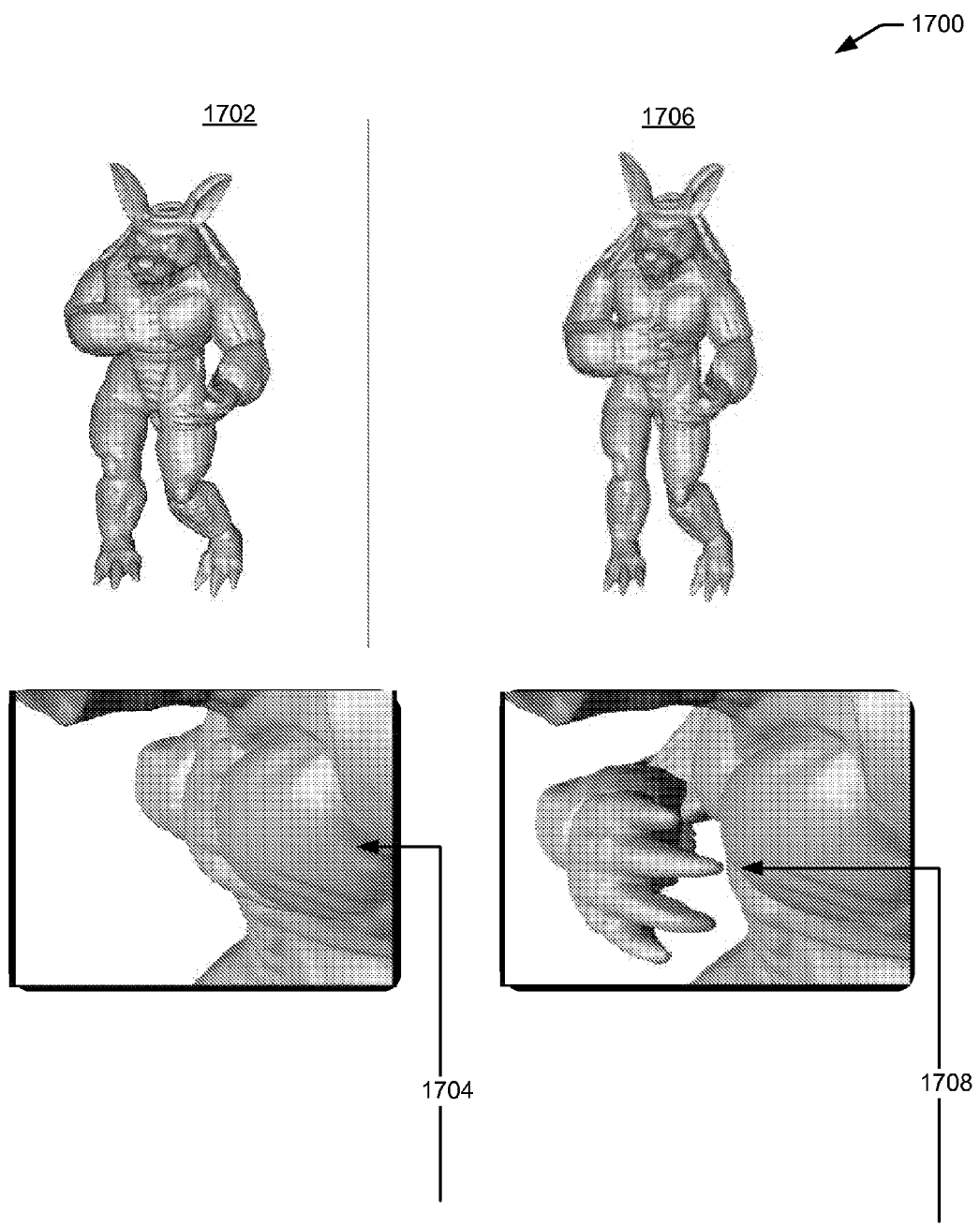
FIG. 17 is a block diagram of exemplary motion retargeting inducing self-collision.

FIG. 17 illustrates an exemplary multiple-object. An important improvement of the technique in the context of multiple-object editing is the treatment of self-collisions. The cascading optimization solver enables (self-) collision detection and handling rather well, contrary to existing skinned mesh deformation techniques. This collision handling occurs by adding one more thread (of very low cost compared to the others in order to maintain interactive rates). Each V-phase starts by performing a collision detection routine using the COLDET pack-age [ColDet]. In practice, use a fast, approximate collision detection using either bounding boxes, or the rigid mesh partition of each bone. If a collision is detected, add a deformation energy (inserted in between the Laplacian and the balance constraints) very similar to the length constraint case to force the middle of each bone to be sufficiently away from the other bone's center: the two bones will thus move away from each other, preventing self-collision.

Illustrated in FIG. 17 is an exemplary result of collision handling 1700. Shown is the armadillo performing a ballet routine 1702. Since the motion capture data comes from a real dancer with a much less prominent torso, the armadillo shows a self-collision by providing no special treatment. In particular, the hand of the armadillo collides with the body 1702, 1704.

Once activated, the collision-handling thread removes the issue and the process slows down by 5%. Thus, the hand of the armadillo is no longer colliding with the body 1706, 1708. Note this simple procedure avoids most intersections and greatly improves the quality of the deformation results.

The framework can be used to transfer the pose of a model to another very easily: this pose transfer is achieved by establishing a few correspondences between the original model and a target mesh and applying our deformation algorithm.

Figure 18:
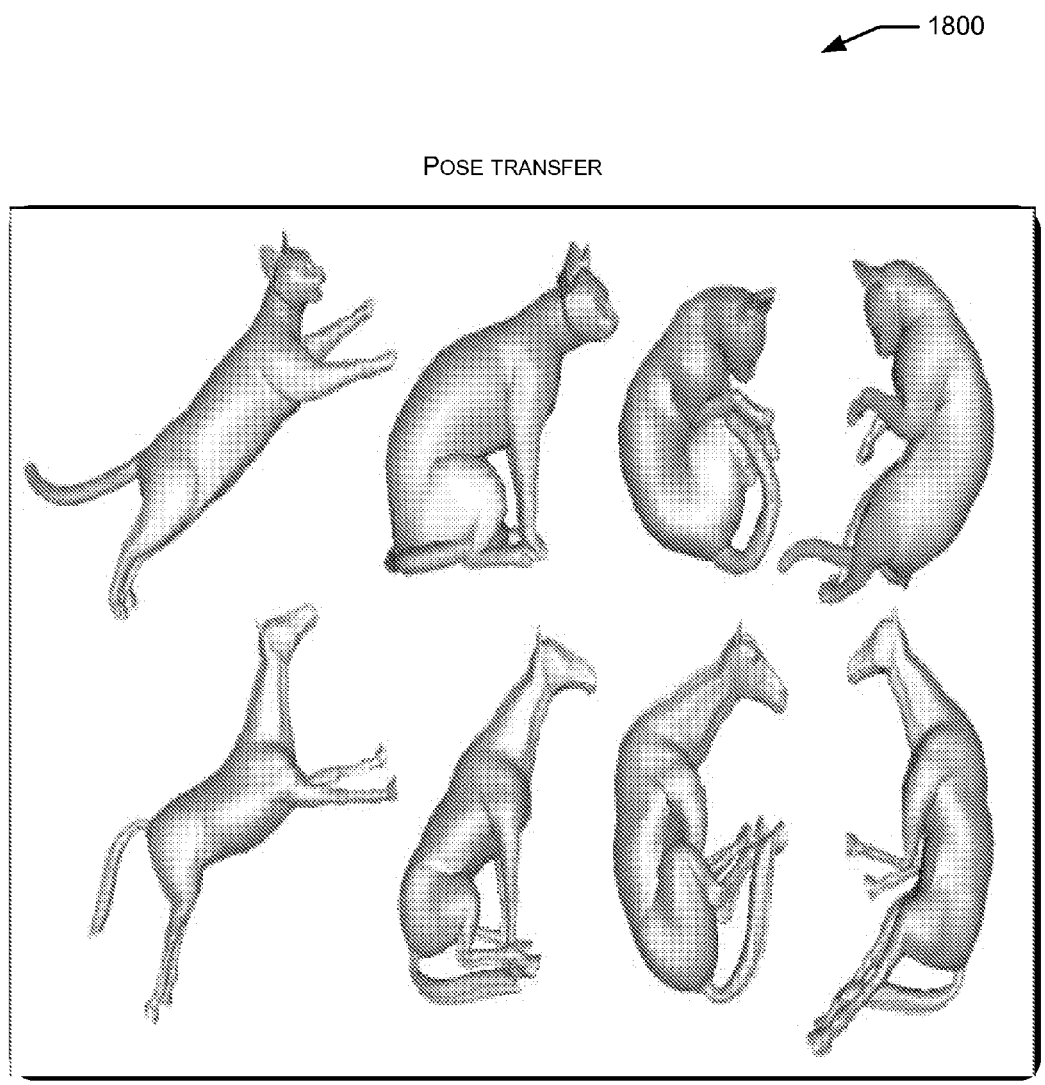
FIG. 18 is a block diagram of exemplary pose transfers.

FIG. 18 illustrates exemplary pose transfers from one model to another model 1800. The user 102 may apply point constraints on the legs, head, neck, and tail of the poses of a cat and transfer them onto a horse while asking for the horse's limbs to keep their length and rigidity. Although the horse's neck and legs are much longer than the cat's, the skinned mesh deformation procedure successfully produces plausible results interactively.

The user 102 can transfer a whole existing animation to a skinned mesh by transferring each individual pose across time. A few correspondences are defined on the very first frame and derived automatically for the rest of the animation (suppose here that the model discretization remains the same throughout the animation). Putting these correspondences as position constraints for another skinned mesh, and minimizing the resulting deformation energy for each frame will automatically re-target the motion. Since the initial condition of the next pose's optimization uses the previous pass, excellent time coherency is obtained.

The user 102 can define additional IK constraints to enforce specific characteristics of the target mesh to best capture the initial animation while sticking to the constraints of the target mesh. For instance, adding a limp to a character only requires enforcing a stiff knee by adding a joint limit constraint: the original animation will be followed as closely as possible while preventing any bending of the knee. Note that there are no restrictions on the format of the source animation: it could be a mesh sequence, or even a point-set sequence (tracker positions). There are no restrictions on the compatibility between skeletons of the source animation and skinned mesh either. In fact, only a few correspondences and the skeleton of the resulting skinned mesh animation needs to be specified. Note that the resulting animation is compactly represented by a series of skeleton poses together with a set of vertex weights for vertices near joints.

Figure 19:
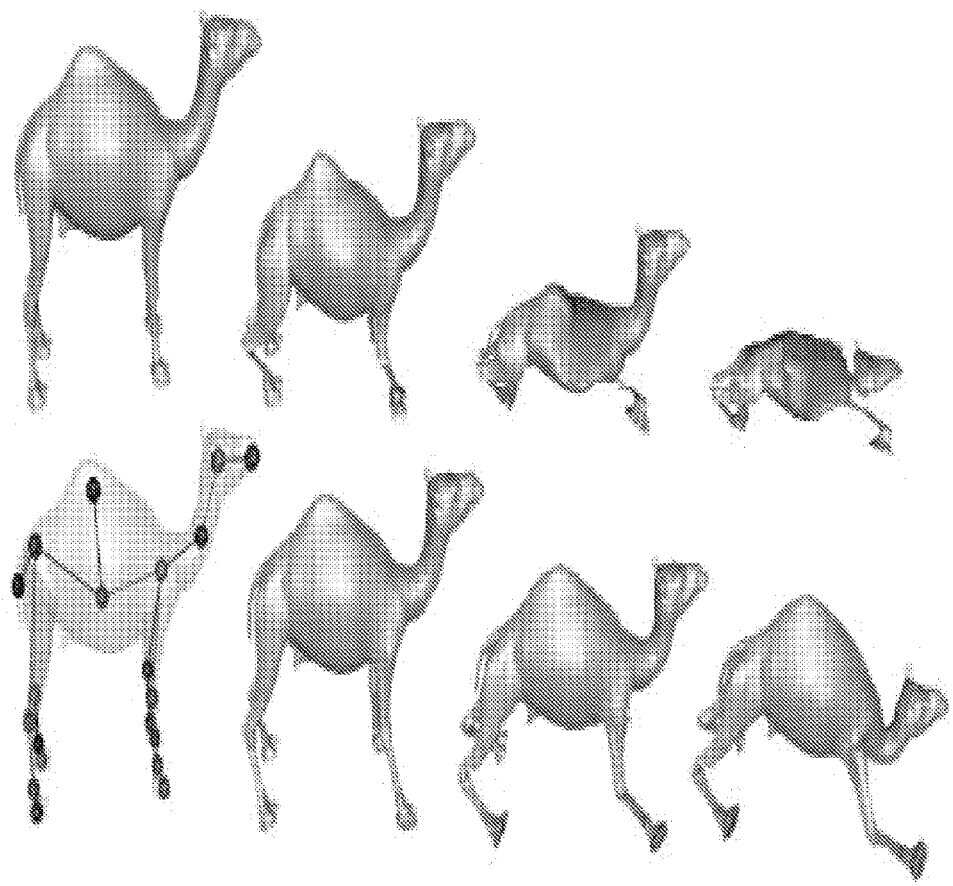
FIG. 19 is a block diagram of an exemplary motion retargeting in conjunction with the constraints.

FIG. 19 illustrates motion retargeting from one model to another model 1900. Shown as reference is a cloth-like camel animation falling down on the ground 1902. First create a simple skinned camel 1904, and then transfer the animation onto the skinned mesh. Further edit this animation 1904 by adding IK constraints (here, length and joint limit constraints) to significantly alter the motion with very little user interaction: the camel now appears to slip on an icy surface 1904.

This describes a variational approach for mesh puppetry. The framework supports direct manipulation of vertices in the skinned mesh, various IK-based deformation constraints, and self-intersection avoidance. The solver uses a novel two-phase cascading optimization procedure, provides an efficient numerical tool to solve the optimization of all the constraints. The custom solver can handle meshes with 50K vertices in real-time (15 frames/s) on a dual-core Pentium 4 PC. Several applications can benefit from this fast solver, including deformation transfer and collision detection/handling.

The applications of such a framework are manifold. First, the solver's strategy could be used in games to improve the efficiency of real-time animation. An intriguing application would also be to offer an interactive platform for template matching: medical datasets of body parts (with known structures and specificities) could be mapped to a particular patient's part through a fast and simple user-guided procedure based on this approach—potentially providing an extremely robust shape matching.

Exemplary Computing Environment

Figure 20:
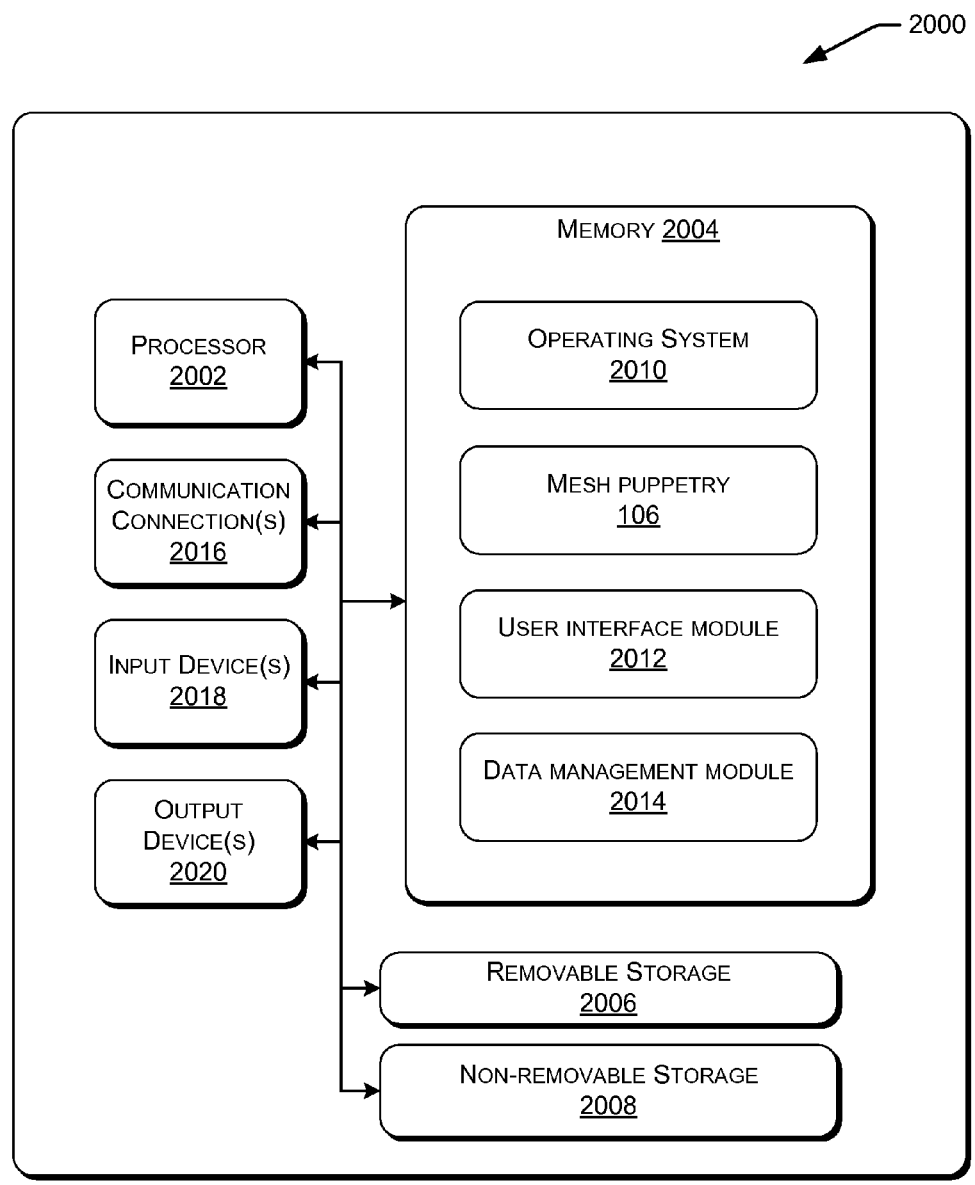
FIG. 20 is a schematic block diagram of an exemplary environment for implementing mesh puppetry.

FIG. 20 is a schematic block diagram of an exemplary general operating environment 2000. The environment 2000 may be configured as any suitable system capable of implementing mesh puppetry 106. In one exemplary configuration, the system comprises at least one processor 2002 and memory 2004. The processing unit 2002 may be implemented as appropriate in hardware, software, firmware, or combinations thereof. Software or firmware implementations of the processing unit 2002 may include computer- or machine-executable instructions written in any suitable programming language to perform the various functions described.

Memory 2004 may store programs of instructions that are loadable and executable on the processor 2002, as well as data generated during the execution of these programs. Depending on the configuration and type of computing device, memory 2004 may be volatile (such as RAM) and/or non-volatile (such as ROM, flash memory, etc.). The system may also include additional removable storage 2006 and/or non-removable storage 2008 including, but not limited to, magnetic storage, optical disks, and/or tape storage. The disk drives and their associated computer-readable media may provide non-volatile storage of computer readable instructions, data structures, program modules, and other data for the communication devices.

Turning to the contents of the memory 2004 in more detail, may include an operating system 2010, one or more mesh puppetry application programs 106 for implementing all or a part of the mesh puppetry optimization. For example, the system 2000 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 2004 includes the mesh puppetry application program 106 including a user interface module 2012 and a data management module 2014. The user interface module 2012 includes but is not limited to, presenting the user with a user interface to perform acts such as enabling interactive design of creating new poses and animations by specifying constraints for the skeletal skinned mesh. Furthermore, the user interface module 2012 allows direct manipulation of the skeletal skinned mesh in real-time to create natural, life-like poses. The data management module 2014 stores and manages storage of information, such as constraints, graphics, design tools, and the like, and may communicate with one or more local and/or remote databases or services.

Computer storage media includes volatile and nonvolatile, removable and non-removable media implemented in any method or technology for storage of information such as computer readable instructions, data structures, program modules or other data. Memory 2004, removable storage 2006, and non-removable storage 2008 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 2000 may also contain communications connection(s) 2016 that allow processor 2002 to communicate with servers, the user terminals, and/or other devices on a network. Communications connection(s) 2016 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The system 2000 may also include input device(s) 2018 such as a keyboard, mouse, pen, voice input device, touch input device, etc., and output device(s) 2020, such as a display, speakers, printer, etc. The system 2000 may include a database hosted on the processor 2002. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for a skinned mesh manipulation, implemented at least in part by a computing device, the method comprising:

optimizing a skeleton position and vertex weights of a skeletal skinned mesh in an integrated manner;

creating new poses and animations by specifying constraints for the skeletal skinned mesh in an interactive deformation platform;

adjusting a skeleton position of the skeletal skinned mesh and solving for a deformed skinned mesh simultaneously with an algorithm in conjunction with the specified constraints, wherein the algorithm comprises a cascading optimization procedure; and displaying the skinned mesh manipulation in real-time.

2. The method of claim 1, wherein the optimizing comprises enabling large scale deformation accelerating convergence while optimizing induced local deformation to maintain small-scale features of the skeletal skinned mesh.

3. The method of claim 1, wherein the specified constraints include Laplacian constraints for preservation of surface details of an undeformed skinned mesh, position constraints to allow direct manipulation of the skeletal skinned mesh, and Inverse Kinematics constraints to provide natural poses with minimal user interaction.

4. The method of claim 1, wherein the specified constraints comprise at least one of a tetrabone, Laplacian coordinates, a vertex position, a vertex weight, a balance, a length, a rigidity preservation, joint limit, a smoothness or Inverse Kinematics.

5. A computer-readable storage media comprising computer-executable instructions that, when executed on a processor, perform the method as recited in claim 1.

6. A user interface having computer-readable instructions that, when executed by a computing device, cause the computing device to perform acts comprising:

presenting functionalities of a position constraint, a length constraint, and a balance constraint for a skeletal skinned mesh;

enabling interactive design of creating new poses and animations by specifying constraints for the skeletal skinned mesh in an interactive deformation platform;

enabling direct manipulation of the skeletal skinned mesh in real-time to create natural, life-like poses based on the specified constraints; and providing an automatic balancing of the skeletal skinned mesh that provides the natural, life-like poses.

7. The user interface of claim 6, wherein the instructions further cause the computing device to perform acts comprising:

receiving input to move the skeletal skinned mesh and multiple objects associated with the skeletal skinned mesh; and enabling movement of the skeletal skinned mesh and the multiple objects associated with the skeletal skinned mesh simultaneously.

8. The user interface of claim 6, wherein the instructions further cause the computing device to perform acts comprising presenting functionalities of joint limit constraints that include a rotation and a twisting of the skeletal skinned mesh.

9. The user interface of claim 6, wherein the instructions further cause the computing device to perform acts comprising prioritizing of the specified constraints to define how the skeletal skinned mesh reacts.

10. The user interface of claim 6, wherein the instructions further cause the computing device to perform acts comprising transferring each individual pose by defining input on a first frame and deriving automatically an animation of the skeletal skinned mesh.

11. A system for skeletal skinned mesh manipulation using a cascading optimization approach, the system comprising:

a processor;

a memory coupled to the processor;

wherein the processor is configured for:

accessing a skeletal skinned mesh in real-time;

receiving input to create new poses and animations of the skeletal skinned mesh;

identifying constraints for preserving details and for allowing direct manipulation of the skeletal skinned mesh to create the new poses and animations;

creating the new poses and the animations of the skeletal-skinned mesh simultaneously with using an algorithm in conjunction with the identified constraints; and displaying the new poses and the animations of the skeletal skinned mesh in real-time.

* * * * *